(12) United States Patent
Dhillon et al.

(10) Patent No.: US 12,403,615 B2
(45) Date of Patent: Sep. 2, 2025

(54) APPROPRIATELY GRIPPING OBJECTS BY ROBOTS

(71) Applicant: International Business Machines Corporation, Armonk, NY (US)

(72) Inventors: Jill S. Dhillon, Jupiter, FL (US); Vinod A. Valecha, Pune (IN); Sarbajit K. Rakshit, Kolkata (IN); Tushar Agrawal, West Fargo, ND (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 18/239,226

(22) Filed: Aug. 29, 2023

(65) Prior Publication Data
US 2025/0073923 A1 Mar. 6, 2025

(51) Int. Cl.
*B25J 9/00* (2006.01)
*B25J 9/16* (2006.01)
*B25J 15/00* (2006.01)

(52) U.S. Cl.
CPC ........... *B25J 15/008* (2013.01); *B25J 9/1664* (2013.01); *B25J 9/1679* (2013.01)

(58) Field of Classification Search
CPC ....... B25J 15/008; B25J 9/1664; B25J 9/1679
See application file for complete search history.

(56) References Cited

U.S. PATENT DOCUMENTS

| | | | |
|---|---|---|---|
| 8,979,034 B2 | 3/2015 | Goff et al. | |
| 9,971,989 B2 | 5/2018 | Wellman | |
| 9,991,412 B2 | 6/2018 | Gonzalez et al. | |
| 10,483,878 B2 | 11/2019 | Heinz | |
| 10,994,299 B2 | 5/2021 | Minichev et al. | |
| 11,072,080 B2 | 7/2021 | Curhan et al. | |
| 11,148,295 B2 | 10/2021 | Correll et al. | |
| 11,565,406 B2 * | 1/2023 | Yerazunis | B25J 15/12 |
| 11,618,158 B2 | 4/2023 | Tang et al. | |
| 11,633,861 B2 | 4/2023 | Declerck et al. | |
| 2020/0338750 A1 * | 10/2020 | Alizadehyazdi | B06B 1/0662 |

(Continued)

OTHER PUBLICATIONS

Song et al., "Adpative Self-Sealing Suction-Based Soft Robotic Gripper," Advanced Science, vol. 8, 2021, pp. 1-11.

(Continued)

*Primary Examiner* — Wade Miles
*Assistant Examiner* — Aaron G Cain
(74) *Attorney, Agent, or Firm* — Shackelford, McKinley & Norton, LLP; Robert A. Voigt, Jr.

(57) ABSTRACT

Described are techniques for appropriately gripping objects by robots. A target object (e.g., circuit board) is identified to be gripped by a robotic arm of a robot, such as a robot in an industrial facility. Upon identifying the target object to be gripped by the robotic arm, the attributes of the target object are determined. One or more pores of the robotic arm may then be selected to be enabled to secrete an adhesive based on the attributes of the target object. Furthermore, the adhesion level corresponding to the amount of the adhesive to be secreted by the selected pores of the robotic arm is determined based on the attributes of the target object. The selected one or more pores of the robotic arm are then activated to secrete the adhesive according to the adhesion level in order to appropriately grip the target object by the robotic arm.

20 Claims, 6 Drawing Sheets

(56) References Cited

U.S. PATENT DOCUMENTS

| | | | |
|---|---|---|---|
| 2021/0094709 A1 | 4/2021 | Barnhart et al. | |
| 2022/0063110 A1* | 3/2022 | Kong | H01L 21/67132 |
| 2022/0089383 A1* | 3/2022 | Gross | B65G 47/918 |
| 2022/0097312 A1* | 3/2022 | Dry | B23P 19/04 |
| 2022/0145928 A1* | 5/2022 | Tolley | B25J 15/0683 |
| 2022/0339794 A1 | 10/2022 | Golan et al. | |
| 2023/0052058 A1 | 2/2023 | Norton et al. | |
| 2023/0122515 A1 | 4/2023 | Fok et al. | |

OTHER PUBLICATIONS

Xu et al., "Learning from Biological Attachment Devices: Applications of Bioinspired Reversible Adhesive Methods in Robotics," Frontiers of Mechanical Engineering, vol. 17, No. 3, 2022, pp. 1-33.

Mehta et al., "RISO: Combining Rigid Grippers with Soft Switchable Adhesives," arXiv:2210.15791v1, Oct. 27, 2022, pp. 1-8.

Chooi et al., "Passive Suction Enhanced Adhesion Pads for Soft Grippers," 2023 6th IEEE-RAS International Conference on Soft Robotics (Robosoft), Singapore, Apr. 2023, pp. 1-8.

Frey et al., "Octopus-Inspired Adhesive Skins for Intelligent and Rapidly Switchable Underwater Adhesion," Science Advances, vol. 8, Jul. 13, 2022, pp. 1-9.

IBM. "Manufacturing technology solutions", retrieved from web https://www.IBM.com/industries/manufacturing, dated Apr. 28, 2025, 5 pages.

IBM. "What is Industry 4.0?", retrieved from web https://www.IBM.com/think/topics/industry-4-0, dated Apr. 28, 2025, 5 pages.

* cited by examiner

APPROPRIATELY GRIPPING OBJECTS BY ROBOTS

TECHNICAL FIELD

The present disclosure relates generally to a manufacturing process, and more particularly to appropriately gripping objects by robots using a robotic arm that intelligently secretes an adhesive in selected pores of the robotic arm.

BACKGROUND

A manufacturing process is the production of a product by processing raw materials. This is accomplished through human labor, the use of machinery and/or other tools and often a biological or chemical process. Manufacturing can be on a large scale, or it can make the pieces that are assembled to build automobiles, airplanes, household appliances, and more.

In manufacturing processes, robotic systems (robots) are often used to automate repetitive, menial tasks, such as material handling and assembly. Robots provide numerous benefits in metal and plastic manufacturing, including improved efficiency, precision, and quality. They can perform tasks such as welding, cutting, assembly, shipping, handling raw materials, product packing, machining, and molding with a high degree of accuracy and repeatability, ensuring consistent production of high-quality parts. For this reason, multiple manufacturers are leveraging robotic automation for an increased number of tasks.

In the manufacturing process, different types of metallic and non-metallic parts may be assembled using robots. Such parts may need to be gripped by the robots, such as on an assembly line. Some of these parts are delicate and need to be handled carefully. Furthermore, some of these parts may need to be extracted from a narrow passage. Hence, such parts may be difficult to be gripped by the robots, such as via grippers, robotic jaws, etc.

By not being able to appropriately grip parts, such parts may end up being broken or not being placed in the appropriate position to be properly assembled with other parts.

SUMMARY

In one embodiment of the present disclosure, a computer-implemented method for appropriately gripping objects by robots comprises identifying a target object to be gripped by a robotic arm of a robot, where the robotic arm contains a plurality of pores configured to secrete an adhesive for gripping objects. The method further comprises determining attributes of the target object. The method additionally comprises selecting one or more pores of the plurality of pores of the robotic arm to be enabled to secrete the adhesive based on the attributes of the target object. Furthermore, the method comprises determining an adhesion level corresponding to an amount of the adhesive to be secreted by the selected one or more pores of the plurality of pores of the robotic arm based on the attributes of the target object. Additionally, the method comprises activating the selected one or more pores of the plurality of pores of the robotic arm to secrete the adhesive according to the adhesion level to grip the target object by the robotic arm.

Furthermore, in one embodiment of the present disclosure, the method additionally comprises determining a relative position of the target object with respect to the robotic arm. The method further comprises instructing the robot to position the robotic arm to grip the target object based on the determined relative position of the target object with respect to the robotic arm.

Additionally, in one embodiment of the present disclosure, the method further comprises instructing the robot to lift the target object and move the target object to a desired location upon gripping the target object using the activated one or more pores of the plurality of pores of the robotic arm secreting the adhesive according to the adhesion level.

Furthermore, in one embodiment of the present disclosure, the method additionally comprises instructing the robot to generate vibrations to detach the target object from the robotic arm upon moving the target object to the desired location.

Additionally, in one embodiment of the present disclosure, the attributes comprise a shape, a dimension, a weight, and chemical properties.

Furthermore, in one embodiment of the present disclosure, the plurality of pores of the robotic arm are connected via a channel within the robotic arm, where the channel within the robotic arm is used to allow a flow of the adhesive to the selected one or more pores of the plurality of pores.

Additionally, in one embodiment of the present disclosure, the selected one or more pores of the plurality of pores of the robotic arm are enabled to secrete the adhesive according to the adhesion level using programmatic controlled valves.

Other forms of the embodiments of the computer-implemented method described above are in a system and in a computer program product.

In this manner, robots are enabled to appropriately grip objects using a robotic arm, such as in an assembly plant, which results in fewer parts being broken and positioning parts in the correct position for assembling.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
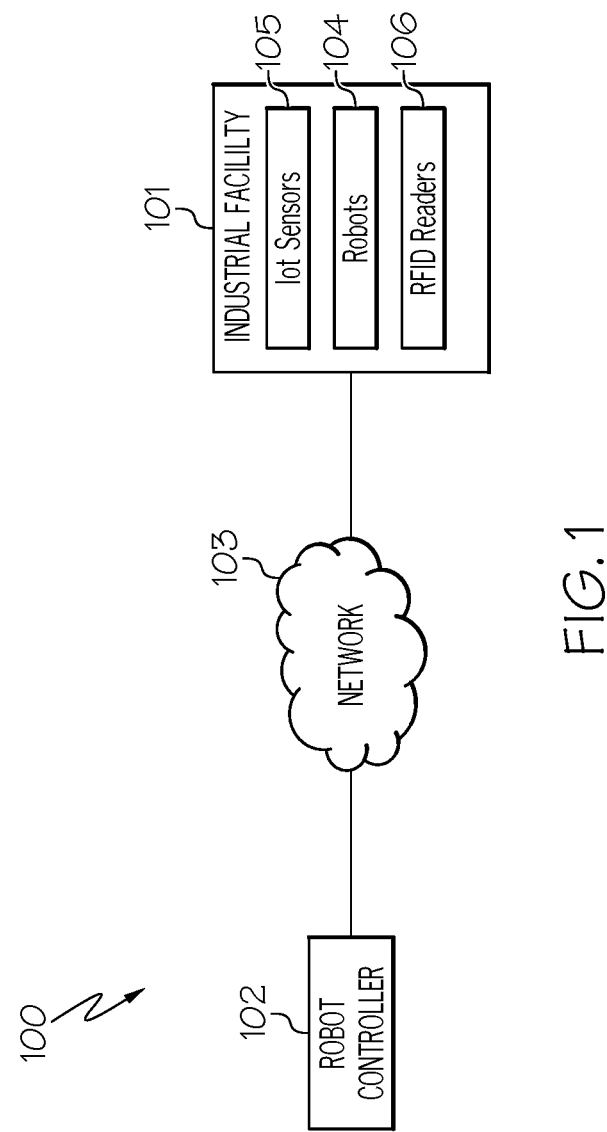
FIG. 1 illustrates an embodiment of the present disclosure of a communication system for practicing the principles of the present disclosure.

In one embodiment of the present disclosure, a computer-implemented method for appropriately gripping objects by robots comprises identifying a target object to be gripped by a robotic arm of a robot, where the robotic arm contains a plurality of pores configured to secrete an adhesive for gripping objects. The method further comprises determining attributes of the target object. The method additionally comprises selecting one or more pores of the plurality of pores of the robotic arm to be enabled to secrete the adhesive based on the attributes of the target object. Furthermore, the method comprises determining an adhesion level corresponding to an amount of the adhesive to be secreted by the selected one or more pores of the plurality of pores of the robotic arm based on the attributes of the target object. Additionally, the method comprises activating the selected one or more pores of the plurality of pores of the robotic arm to secrete the adhesive according to the adhesion level to grip the target object by the robotic arm.

In this manner, robots are enabled to appropriately grip objects using a robotic arm, such as in an assembly plant, which results in fewer parts being broken and positioning parts in the correct position for assembling.

Furthermore, in one embodiment of the present disclosure, the method additionally comprises determining a relative position of the target object with respect to the robotic arm. The method further comprises instructing the robot to position the robotic arm to grip the target object based on the determined relative position of the target object with respect to the robotic arm.

In this manner, the robotic arm can be correctly positioned to grip the target object.

Additionally, in one embodiment of the present disclosure, the method further comprises instructing the robot to lift the target object and move the target object to a desired location upon gripping the target object using the activated one or more pores of the plurality of pores of the robotic arm secreting the adhesive according to the adhesion level.

In this manner, the target object can be lifted and moved to the desired location.

Furthermore, in one embodiment of the present disclosure, the method additionally comprises instructing the robot to generate vibrations to detach the target object from the robotic arm upon moving the target object to the desired location.

In this manner, the target object can be detached from the robotic arm by the robot generating vibrations.

Additionally, in one embodiment of the present disclosure, the attributes comprise a shape, a dimension, a weight, and chemical properties.

In this manner, the attributes of the target object include a shape, a dimension, a weight, and chemical properties, which are used to select the pore(s) of the robotic arm to be enabled to secrete the adhesive.

Furthermore, in one embodiment of the present disclosure, the plurality of pores of the robotic arm are connected via a channel within the robotic arm, where the channel within the robotic arm is used to allow a flow of the adhesive to the selected one or more pores of the plurality of pores.

In this manner, the pores of the robotic arm are connected via a channel within the robotic arm, where the channel is used to allow a flow of the adhesive to the selected pores thereby enabling the secretion of the adhesive by the pores.

Additionally, in one embodiment of the present disclosure, the selected one or more pores of the plurality of pores of the robotic arm are enabled to secrete the adhesive according to the adhesion level using programmatic controlled valves.

In this manner, the selected pores of the robotic arm are enabled to secrete the adhesive according to the adhesion level using programmatic controlled valves thereby enabling the application of the adhesive exactly where needed, with the right amount of pressure and for the right length of time to ensure that the adhesive is applied consistently and efficiently.

Other forms of the embodiments of the computer-implemented method described above are in a system and in a computer program product.

As stated above, in manufacturing processes, robotic systems (robots) are often used to automate repetitive, menial tasks, such as material handling and assembly. Robots provide numerous benefits in metal and plastic manufacturing, including improved efficiency, precision, and quality. They can perform tasks such as welding, cutting, assembly, shipping, handling raw materials, product packing, machining, and molding with a high degree of accuracy and repeatability, ensuring consistent production of high-quality parts. For this reason, multiple manufacturers are leveraging robotic automation for an increased number of tasks.

In the manufacturing process, different types of metallic and non-metallic parts may be assembled using robots. Such parts may need to be gripped by the robots, such as on an assembly line. Some of these parts are delicate and need to be handled carefully. Furthermore, some of these parts may need to be extracted from a narrow passage. Hence, such parts may be difficult to be gripped by the robots, such as via grippers, robotic jaws, etc.

By not being able to appropriately grip parts, such parts may end up being broken or not being placed in the appropriate position to be properly assembled with other parts.

The embodiments of the present disclosure provide a means for enabling robots to appropriately grip objects using a robotic arm that intelligently secretes an adhesive in selected pores of the robotic arm. As a result of appropriately gripping parts, fewer parts will be broken and parts will more likely be in the correct position for assembling. In one embodiment of the present disclosure, one or more pores in the robotic arm are selected to be enabled to secrete an adhesive based on the attributes (e.g., size, shape, weight, chemical properties, etc.) of the target object (part to be gripped). A robotic arm, as used herein, refers to a type of mechanical arm, that is programmable, with similar functions to a human arm. In one embodiment, the robotic arm includes links that are connected by joints allowing either rotational motion (such as in an articulated robot) or translational (linear) displacement. Furthermore, an adhesion level corresponding to the amount of adhesive to be secreted by the selected pores of the robotic arm is determined based on the attributes of the target object. The robotic arm is then positioned to grip the target object and the selected pores of the robotic arm are activated to secrete the adhesive according to the adhesion level to grip the target object. The target object is then lifted and moved to a desired located, such as to be assembled with another part(s). In this manner, robots are enabled to appropriately grip objects using a robotic arm, which results in fewer parts being broken and positioning parts in the correct position for assembling. A further discussion regarding these and other features is provided below.

In some embodiments of the present disclosure, the present disclosure comprises a computer-implemented method, system, and computer program product for appropriately gripping objects by robots. In one embodiment of the present disclosure, a target object (e.g., circuit board, brake pads, brake rotors, brake shoes, wheel cylinders, wheel bearings, wheel studs, etc.) is identified to be gripped by a robotic arm of the robot, such as a robot in an industrial facility (e.g., assembly plant). In one embodiment, the target object is identified by analyzing captured images of the target object using image processing techniques. Upon identifying the target object (e.g., circuit board of type A) to be gripped by the robotic arm of the robot, the attributes of the target object are determined. Attributes, as used herein, refer to the quality or feature regarded as a characteristic or inherent part of the target object. Examples of attributes can include, but are not limited to, shape, dimensions, texture, weight, chemical properties, etc. In one embodiment, such attributes are determined by accessing a data structure (e.g., table) storing attributes for the various objects that may be gripped by the robots in the industrial facility. One or more pores of the robotic arm may then be selected to be enabled to secrete an adhesive based on the attributes of the target object. Such pores are openings located on the surface of the robotic arm. The use of pores allow for precise and controlled application of the adhesive (e.g., rubber-based adhesives, acrylic-based adhesives, silicone-based adhesives, etc.). The adhesion level corresponding to the amount of the adhesive to be secreted by the selected pores of the robotic arm is determined based on the attributes of the target object. For example, a target object with a greater dimension, shape and/or weight may require a greater amount of the adhesive to be secreted by the selected pores in order for the robotic arm to securely grip the target object. The selected one or more pores of the robotic arm are then activated to secrete the adhesive according to the adhesion level in order to appropriately grip the target object by the robotic arm. In this manner, robots are enabled to appropriately grip objects using a robotic arm, such as in an assembly plant, which results in fewer parts being broken and positioning parts in the correct position for assembling.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes an industrial facility 101 connected to a robot controller 102 via a network 103.

An "industrial facility" 101, as used herein, refers to a complex (e.g., manufacturing plant, assembly plant) which may consist of one or more buildings used for manufacturing a physical product. In one embodiment, industrial facility 101 includes one or more robots 104 that are utilized on an industrial floor (floor, such as concrete, used in industrial and commercial settings) that are controlled by robot controller 102. A "robot" (also referred to as an industrial robot), as used herein, is a machine capable of carrying out a complex series of actions automatically, such as in the manufacturing process. In one embodiment, robots are automated, programmable, and capable of movement on three or more axes. Typical applications of robots include welding, painting, assembly, disassembly, pick and place, such as for printed circuit boards, packing and labeling, palletizing, product inspection, testing, material handling, etc. Examples of such robots 104 can include, but are not limited to, continuum robots (type of robot that is characterized by infinite degrees of freedom and number of joints), pneumatic robots (type of robots that receives locomotion from compressed air) and soft robots (constructed from delicate, flexible, and lifelike materials, which enable soft robots to more nimbly explore). A detailed description of the physical and logical components of robots 104 is provided below in connection with FIG. 3.

Furthermore, in one embodiment, robots 104 utilize a robotic arm for gripping objects, such as parts that are used in assembling a final product or a component of the final product. A robotic arm, as used herein, refers to a type of mechanical arm, that is programmable, with similar functions to a human arm. In one embodiment, the robotic arm includes links that are connected by joints allowing either rotational motion (such as in an articulated robot) or translational (linear) displacement.

In one embodiment, such robotic arms are flexible with a set of opening pores. In one embodiment, these pores are small openings or holes that are located on the surface of the robotic arm as shown in FIG. 2.

Figure 2:
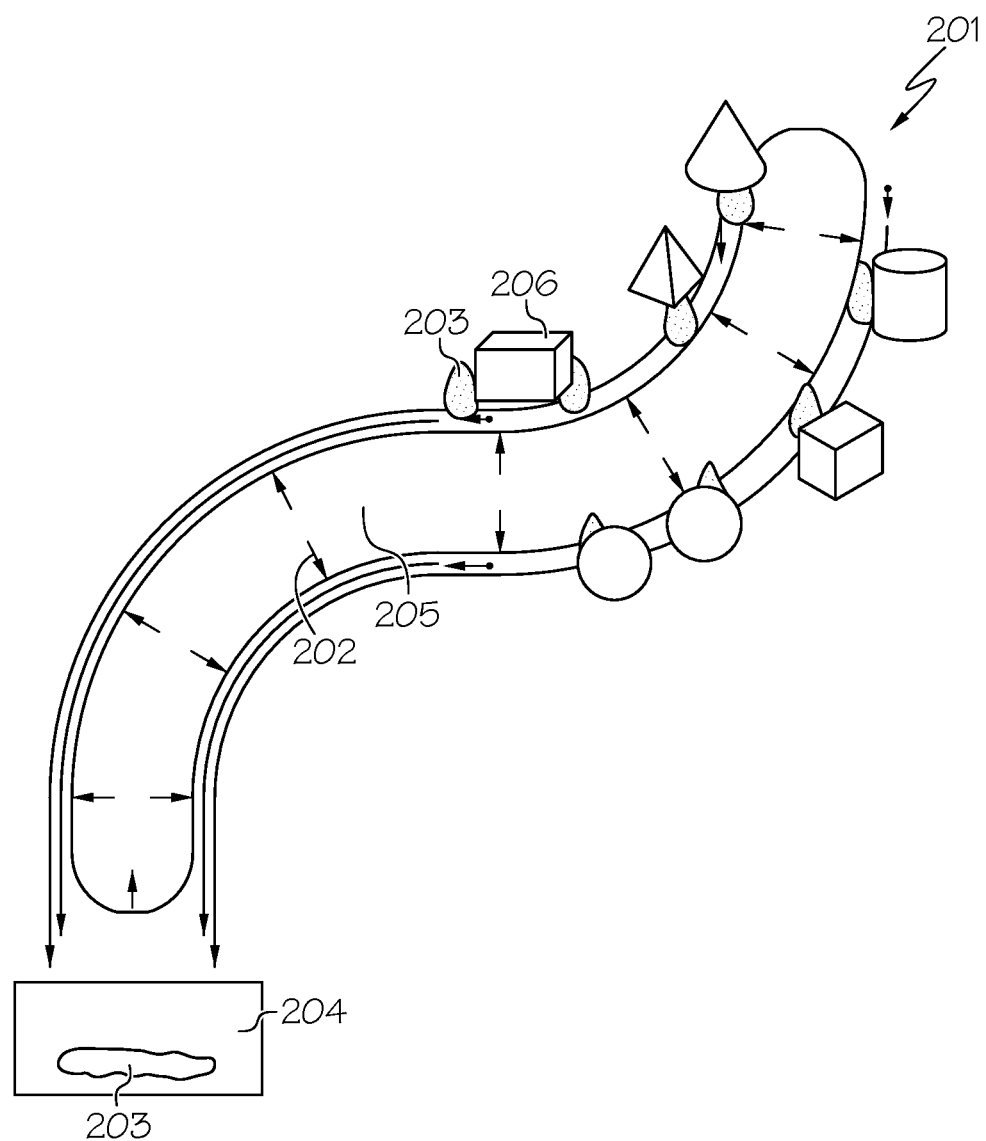
FIG. 2 illustrates a robotic arm of a robot in accordance with an embodiment of the present disclosure.

FIG. 2 illustrates a robotic arm 201 of robot 104 in accordance with an embodiment of the present disclosure.

Referring to FIG. 2, in conjunction with FIG. 1, robotic arm 201 includes a set of pores 202, which are openings located on the surface of robotic arm 201. In one embodiment, pores 202 are connected through a channel 205 within robotic arm 201, which allows for the flow of an adhesive 203 from a container 204 or reservoir attached to robotic arm 201. In one embodiment, adhesive 203 is stored in container 204 until it is ready for use by robotic arm 201.

Furthermore, as shown in FIG. 2, adhesive 203 is secreted from the opening pores 202 to grip different objects 206. Objects 206 may correspond to the target objects discussed herein.

In one embodiment, robotic arm 201 is flexible which allows it to bend and move in different directions, making it versatile enough to be used in various applications. Examples of such robotic arms 201 can include, but are not limited to, Jaka® Pro, Kuka® KR Cybertech, Denso® Cobotta Pro, etc.

In one embodiment, the use of pores 202 of robotic arm 201 allow for precise and controlled application of adhesive 203, where channel 205 within robotic arm 201 ensures that adhesive 203 is delivered efficiently and accurately. Examples of channel 205 can include, but are not limited to, flow channels, such as hydrodynamic channels.

In one embodiment, adhesive 203 is a non-metallic substance that when applied to one or more surfaces of an object (e.g., circuit board) binds the object to robotic arm 201 and resists their separation. In one embodiment, such an adhesive 203 is a nonreactive adhesive which forms a bond when pressure is applied to bond the adhesive with a surface of the object (e.g., circuit board).

In one embodiment, adhesive 203 is a pressure-sensitive adhesive. In such an adhesive, the degree of such a bond is influenced by an amount of adhesive 203 and the amount of pressure which is used to apply adhesive 203 to the surface of the object (e.g., circuit board). In one embodiment, such an adhesive (pressure-sensitive adhesive) reduces or loses their tack at low temperatures and reduces their shear holding ability at high temperatures. In one embodiment, such an adhesive is designed to form a temporary bond and can be removed without leaving residue on the adherend.

In one embodiment, the composition of pressure-sensitive adhesives is based on an elastomer compounded with a suitable tackifier (e.g., a rosin ester). In one embodiment, an example of such a pressure-sensitive adhesive is styrene block copolymers. Examples of adhesive 203 that are a pressure-sensitive adhesive can include, but are not limited to, rubber-based adhesives (e.g., styrene butadiene (SBR), nitrile rubber (NBR), polychloroprene (Neoprene) and silicones), acrylic-based adhesives (resin-based adhesive that is comprised of acrylic or methylacrylic polymers), and silicone-based adhesives (versatile water resistant polymer whose primary ingredient is silica). Other examples of pressure-sensitive adhesives can include, but are not limited to, gummy glue, Zip Grip TE 2400, Zip Grip GPE 3, etc.

In one embodiment, pores 202 of robotic arm 201 have programmatic controlled valves so that pores 202 can be opened programmatically. In one embodiment, such valves correspond to flow control valves (e.g., ASCO™ series 226 and the like) or pneumatic valves (e.g., robot-arm-mounted electrically operated air on/off valves by McMaster-Carr® and the like). In one embodiment, these valves are controlled by robot controller 102, which decides when to open or close the valves. The programmatic control of the valves allows robotic arm 201 to apply adhesive 203 in a precise and controlled manner. By opening and closing the valves at the right times, robotic arm 201 will be able to apply adhesive 203 via pores 202 exactly where needed, with the right amount of pressure and for the right length of time to ensure that adhesive 203 is applied consistently and efficiently.

As discussed above, container 204 stores adhesive 203 until it is ready for use by robotic arm 201. In one embodiment, container 204 is designed to store a user-designated amount of adhesive 203. In one embodiment, adhesive 203 is stored in a viscous liquid state so that it can be easily dispensed through pores 202 of robotic arm 201.

In one embodiment, container 204 utilizes a mechanism for controlling the fluidity of adhesive 203. In one embodiment, the fluidity of adhesive 203 is controlled by mixing a chemical(s) with adhesive 203 in container 204 to change the viscosity and flow characteristics of adhesive 203. Examples of such chemicals can include, but are not limited to, amorphous silicon dioxide, precipitated calcium carbonate, kaolin, bentonite, talc, xanthan gum, sodium carboxymethylcellulose, etc.

In another embodiment, the fluidity of adhesive 203 is controlled via the use of a pump. In a further embodiment, the fluidity of adhesive 203 is controlled by using a heating element to increase the temperature of adhesive 203 and reduce its viscosity. Examples of such a heating element can include, but are not limited to, a silicone rubber fiberglass insulated flexible heater (e.g., Omega® SRFGA-209/10-P), etc. Alternatively, a cooling element is used to reduce the temperature of adhesive 203 and increase its viscosity. Examples of such a cooling element can include, but are not limited to, Kenics® heat exchanger and the like.

In one embodiment, the fluidity of adhesive 203 is controlled using such mechanisms as discussed above based on the attributes of the object (e.g., circuit board). For example, for a heavy object, a larger number of pores 202 will be activated to secrete adhesive 203. In order for a larger number of pores 202 to be activated to secrete adhesive 203, the viscosity of adhesive 203 may need to be reduced, such as by increasing the temperature of adhesive 203 stored in container 204.

Returning to FIG. 1, in conjunction with FIG. 2, in one embodiment, the data regarding the operations being performed by robots 104 is obtained from Internet of Things (IoT) sensors 105. IoT sensor 105, as used herein, refers to a sensor that can be attached to robot 104. Furthermore, IoT sensors 105 are configured to exchange data with other devices and systems over a network, such as network 103. In one embodiment, IoT sensors 105 are configured to monitor robots 104 in industrial facility 101. For example, IoT sensors 105 may monitor the operations of robots 104, such as loading and unloading parts, material handling, transferring finished parts to post-processing, drilling, welding, painting, product inspection, picking and placing, die casting, glass making, grinding, etc. In one embodiment, the current location of robots 104 in industrial facility 101 is determined based on location information (e.g., GPS (Global Positioning System) data) being provided to robot controller 102 via the attached IoT sensors 105. Such data may then be captured by IoT sensors 105 and relayed to robot controller 102 via network 103 to be stored, such as in a storage device of robot controller 102. Examples of IoT sensors 105 can include, but are not limited to, IoT sensors manufactured by CorSense®, Memfault, Augury®, PTC®, TE Connectivity®, etc.

Furthermore, as discussed above, robot controller 102 is configured to control robots 104. While FIG. 1 illustrates robot controller 102 being located outside of industrial facility 101, it is noted that robot controller 102 may be located internally within industrial facility 101.

In one embodiment, robot controller 102 is configured to identify a target object (e.g., part, such as brake pads, brake rotors, brake shoes, wheel cylinders, wheel bearings, wheel studs, etc.) to be gripped by robotic arm 201 of robot 104. A "target object," as used herein, refers to the object, such as a part, to be gripped by robotic arm 201 of robot 104. As will be discussed in greater detail below, such an identification of the target object may be made using captured images of the target object, such as by a camera located in industrial facility 101 or on robot 104. In one embodiment, image processing techniques or computer vision techniques are utilized to analyze the captured images of the target object to identify the target object based on its features, such as shape and color.

In one embodiment, an expert may instruct robot controller 102 as to which robots 104 will be programmed to grip which particular object (e.g., brake pad), such as based on the particular robotic arms 201 attached to such robots 104.

In one embodiment, information as to which particular target objects are to be gripped by which robots 104 (via robotic arm 201) is stored in a data structure (e.g., table), which may reside within the storage device of robot controller 102. In one embodiment, each robot 104 is uniquely identified via a serial number. As a result, in such a data structure, the robot identified via a serial number is associated with one or more target objects to be gripped. In one embodiment, such target objects are also identified in the data structure via a unique serial number. In one embodiment, such a data structure is populated by an expert. As a result, in one embodiment, robot controller 102 is configured to identify a target object to be gripped by robotic arm 201 of a particular robot 104 based on extracting such information from such a data structure.

In one embodiment, upon identifying the target object, attributes of the target object (e.g., shape, dimensions, texture, weight, chemical properties, etc.) may be obtained by robot controller 102 accessing a data structure (e.g., table) storing attributes for the various objects that may be gripped by robots 104 in industrial facility 101. In one embodiment, such a data structure resides within the storage device of robot controller 102. In one embodiment, such a data structure is populated by an expert.

In one embodiment, robot controller 102 is configured to determine a relative position of the target object with respect to robotic arm 201. In one embodiment, such a relative position is determined using a depth sensor (e.g., LiDAR (light detection and ranging) sensor). In one embodiment, such a relative position is determined using computer vision techniques.

Furthermore, in one embodiment, robot controller 102 is configured to select one or more pores 202 to be enabled to secrete adhesive 203 by the selected pores 202 based on the attributes of the target object. For example, a target object with a greater dimension, shape and/or weight may require a greater number of pores 202 to be selected to be enabled to secrete adhesive 203 in order to securely grip the target object by robotic arm 201.

Furthermore, in one embodiment, robot controller 102 is configured to determine an adhesion level corresponding to the amount of adhesive 203 to be secreted by the selected pores 202 of robotic arm 201 based on the attributes of the target object. For example, a target object with a greater dimension, shape and/or weight may require a greater amount of adhesive 203 to be secreted by the selected pores 202 in order to securely grip the target object by robotic arm 201.

Additionally, in one embodiment, robot controller 102 is configured to position robotic arm 201 of robot 104 to appropriately grip the target object based on the relative position of the target object with respect to robotic arm 201.

Upon positioning robotic arm 201 of robot 104 to appropriately grip the target object, the selected pores 202 to secrete adhesive 203 are activated to secrete adhesive 203 according to the adhesion level in order to appropriately grip the target object. Upon gripping the target object, in one embodiment, robot controller 102 instructs robot 104 to lift the target object and move the target object to a desired location, such as to another robot 104 configured to assemble a final product using such a target object.

In one embodiment, robot controller 102 instructs robot 104 to detach the target object from robotic arm 201 upon arrival at the desired location, such as by instructing robot 104 to generate vibrations that travel through robotic arm 201.

A further discussion regarding these and other features is provided further below.

A description of the software components of robot controller 102 used for controlling robots 104 to appropriately grip objects using robotic arm 201 that intelligently secretes adhesive 203 in selected pores 202 is provided below in connection with FIG. 4. A description of the hardware configuration of robot controller 102 is provided further below in connection with FIG. 5.

As discussed above, industrial facility 101 is connected to robot controller 102 via a network 103. Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, industrial facility 101 includes RFID readers 106 that scan the RFID tags on objects (e.g., parts), such as the target object to be gripped by robotic arm 201. In one embodiment, scanning RFID tags includes reading, referencing, and/or obtaining electronically stored information from the RFID tags as would be known by one of ordinary skill in the art in light of the present disclosure. In another embodiment, each RFID tag includes an RF transmitter and receiver. In another embodiment, RFID reader 106 transmits a signal which is received by the RFID tag. The RFID tag responds to RFID reader 106 with information stored in the RFID tag. Such information may include a location of the object (e.g., a part in industrial facility 101) with the attached RFID tag. For example, RFID tags (e.g., Air Finder® active RFID tags and the like) may calculate their location relative to reference points and send this data to nearby RFID readers 106. RFID readers 106 may then send such location data to an application (e.g., Air Finder® & Device Tracker application and the like) of robot controller 102 via network 103, which formulates an estimated location of the object. In this manner, the current location of the object, such as the target object, in industrial facility 101 is known.

In one embodiment, RFID reader 106 is maintained in a low-power state between item scans, extending the battery life of RFID reader 106. In one embodiment, RFID reader 106 may be powered by an onboard battery.

System 100 is not to be limited in scope to any one particular network architecture. System 100 may include any number of industrial facilities 101, robot controllers 102, networks 103, robots 104, IoT sensors 105, and RFID readers 106.

A discussion regarding the primary physical and logical components of robots 104 is provided below in connection with FIG. 3.

Figure 3:
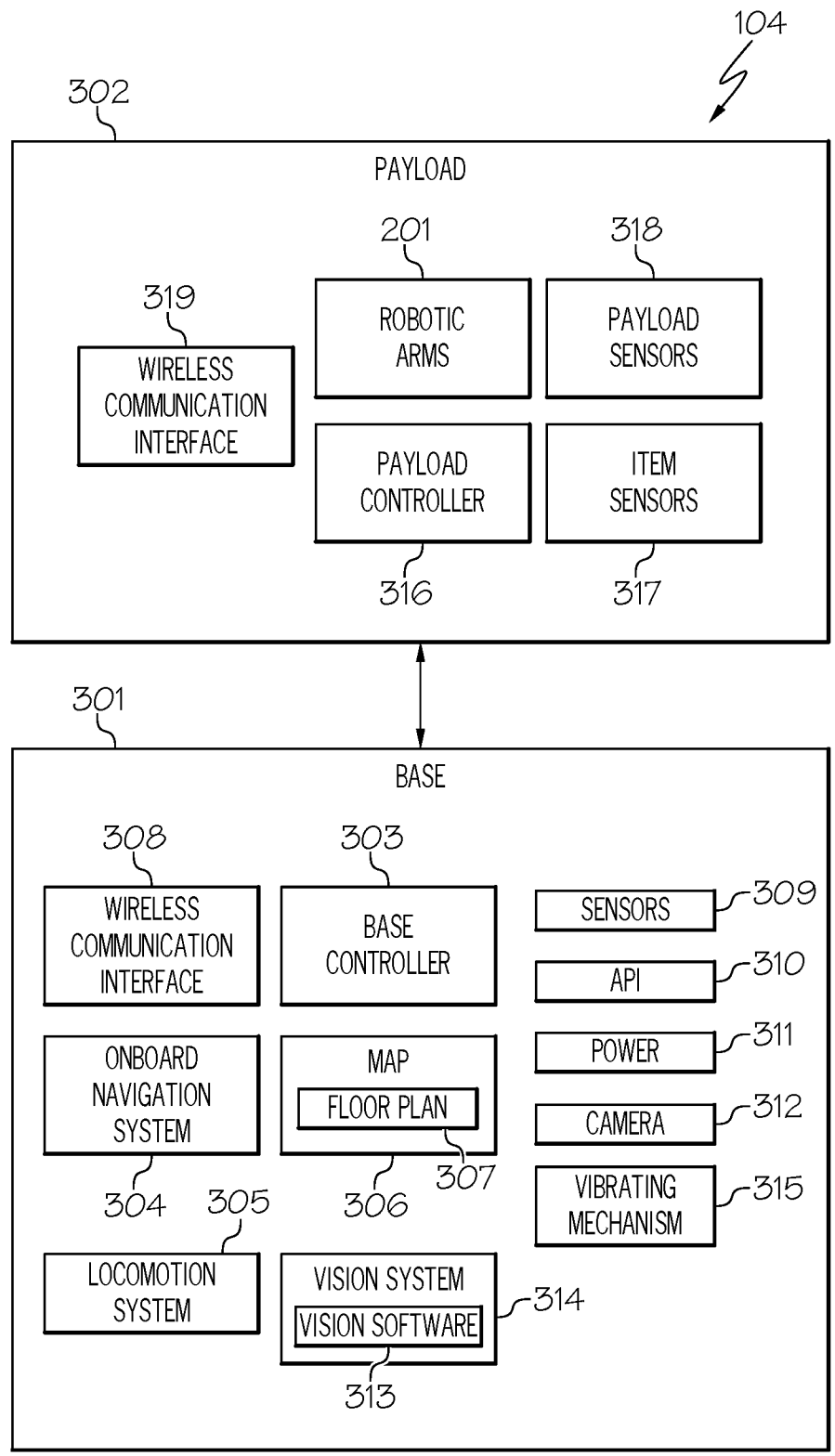
FIG. 3 illustrates the primary physical and logical components of the robot in accordance with an embodiment of the present invention.

Referring now to FIG. 3, in conjunction with FIGS. 1-2, FIG. 3 illustrates the primary physical and logical components of robot 104 in accordance with an embodiment of the present invention.

As shown in FIG. 3, robot 104 includes a base 301 and a payload 302. In one embodiment, base 301 includes a variety of hardware and software components, including a base controller 303, an onboard navigation system 304, a locomotion system 305, a map 306 defining a floor plan 307, such as the floor plan of industrial facility 101, a wireless communication interface 308, sensors 309, an application programming interface (API) 310, a power system 311 (also referred to as simply "power"), a camera 312, vision software 313, a vision system 314, and a vibrating mechanism 315 (e.g., spindle).

In one embodiment, base controller 303 includes computer program instructions executable on a microprocessor (not shown) to initiate, coordinate, and manage all of the automation functions associated with robot 104, including without limitation, handling of job assignments, automatic locomotion and navigation, communications with other computers and other robots 104, activating the payload functions, and controlling power functions. In one embodiment, base controller 303 has an assignment manager (not shown) that keeps track of all of the robot's assignments and job operations. When a job assignment is received by robot 104, base controller 303 activates the other subsystems in robot 104 to respond to the job assignment. Thus, base controller 303 generates and distributes the appropriate command signals that cause other processing modules and units on robot 104 to start carrying out the requested job assignment. So, for example, when the received job assignment requires that robot 104 drives itself to a certain part chamber at a certain location in the physical environment, such as industrial facility 101, it is base controller 303 that generates the command signal that causes onboard navigation system 304 to start driving robot 104 to the specified destination. Base controller 303 also provides an activation signal for payload 302, if necessary, to cause payload 302 to perform a particular operation (e.g., grip the target object by robotic arm 201) at the specified job location, which was received from robot controller 102. Base controller 303 also manages and updates map 306, and floor plan 307, when appropriate, based on updated map or floor plan information received from robot controller 102 or other robots 104 in the computer network. Base controller 303 also receives assignment status information, if any, from payload 302 and, if appropriate, relays the status information out to robot controller 102, which typically delegates job assignments to robots 104. Typically, base controller 303 will communicate with robot controller 102 via an application programming interface (API) 310 and a wireless communications interface 308.

In one embodiment, map 306 defines a floor plan 307 corresponding to the physical environment of industrial facility 101, and also defines a set of job locations in terms of floor plan 307. In one embodiment, map 306 also associates one or more job operations with one or more of the job locations in the set of job locations. In one embodiment, each job location on floor plan 307 corresponds to an actual location in the physical environment, such as industrial facility 101. Some of the job locations on floor plan 307 will also have associated with them a set of one or more job operations to be carried out automatically by robot 104 after robot 104 arrives at the actual location. In one embodiment, map 306 may be obtained by base controller 303 from robot controller 102 or from another robot 104 or from a stand-alone operating terminal for the network (not shown). Certain job operations on floor plan 307 may have multiple locations in the physical environment, such as industrial facility 101. It is understood, however, that not all job operations need to be pre-programmed into map 306. It is also possible for job operations to be commanded as needed by base controller 303, or robot controller 102, irrespective of whether or not the job operation is defined in map 306.

In one embodiment, onboard navigation system 304, operating under the control of base controller 303, handles all of the localization, path planning, path following, and obstacle avoidance functions for robot 104. If the system includes a positive and negative obstacle avoidance engine to help robot 104 avoid colliding with objects that may be resting on the floor but whose shape is not appropriately identified by the robot's horizontally scanning laser, and to avoid driving into gaps in the floor, this functionality is encompassed by onboard navigation system 304. In one embodiment, onboard navigation system 304 automatically determines the job location for the job assignment based on the map and the job assignment. Using sensors 309, onboard navigation system 304 also detects when driving robot 104 along a selected path (movement path) from the robot's current position to an actual location in the physical environment will cause robot 104 to touch, collide or otherwise come too close to one or more of the stationary or non-stationary obstacles in the physical environment. When onboard navigation system 304 determines that contact with an obstacle might occur, it is able to automatically plan a path around the obstacle and return to the movement path as established by robot controller 102. In one embodiment, onboard navigation system 304 may also use sensing lasers to sample objects in the physical environment, and compare the samples with information in map 306. This process is called "laser localization." Another known technique, called light localization, involves using a camera to find lights in the ceiling and then comparing the lights found to lights identified on map 306. All of these different techniques may be employed to help onboard navigation system 304 determine its current position relative to the job location.

In one embodiment, onboard navigation system 304 operates in combination with locomotion system 305 to drive robot 104 from its current location to the source or target location along the established movement path.

In one embodiment, API 310 is operatable with base controller 303 and wireless communication interface 308 to provide information and commands to base controller 303 as well as retrieve job assignment status and route information from base controller 303. For example, if payload 302 needs to send information concerning the status of the item being transported, such information may be transmitted from payload controller 316 to base controller 303 via API 310. Base controller 303 will then transmit such information to robot controller 102 through the same API 310. In one embodiment, API 310 is ARCL or ArInterface, an application programming interface distributed by Omron Adept Technologies, Inc. of San Ramon, California.

Sensors 309 may include a collection of different sensors, such as sonar sensors, bumpers, cameras, gas sensors, smoke sensors, motion sensors, etc., and can be used to perform a variety of different functions. These sensors may also be used for traffic mitigation by redirecting robot 104 when other robots 104 are detected in the immediate surroundings. Furthermore, in one embodiment, sensors 309 include depth sensors, such as LiDAR (light detection and ranging) sensors, which determine a relative position of the target object with respect to robotic arm 201 of robot 104. In one embodiment, such a depth sensor determines a distance between robotic arm 201 of robot 104 and the target object, which is identified by robot controller 102, by emitting short pulses of laser light and measuring the time it takes for the light to be reflected by the target object. Such information is used to calculate the distance between the sensor and the target object. In one embodiment, LiDAR sensors may operate in a fixed direction (e.g., vertical) or it may scan multiple directions. Examples of a depth sensor can include, but are not limited to, Leddar® Pixell LiDAR sensor, RPLIDAR S2, 360 Degree LiDAR by Studica® Robotics, Garmin® LIDAR-Lite V3, etc.

Base 301 further includes power system 311, which typically includes a battery and software to manage the battery.

In one embodiment, locomotion system 305 includes the hardware and electronics necessary for making robot 104 move including, for example, motors, wheels, feedback mechanisms for the motors and wheels, and encoders. In one embodiment, onboard navigation system 304 "drives" robot 104 by sending commands down to the wheels and motors through locomotion system 305.

In one embodiment, locomotion system 305 further includes the hardware and electronics necessary for making robotic arm 201 move including, for example, motors situated in the space between the joints of robotic arm 201. In one embodiment, robot controller 102 moves robotic arm 201 by sending commands to such motors through locomotion system 305 either directly or indirectly, such as via base controller 303. In one embodiment, such motors move independently of one another at various speeds to drive robotic arm 201 in whichever direction robot controller 102 requests.

Furthermore, base 301 includes a camera 312 (e.g., three-dimensional camera) integrated with machine vision software 313 to detect and track objects, such as the target object, using a vision system 314. Such vision software 313 is fused with algorithms to enable object detection, tracking, and positioning. Vision system 314 corresponds to a computing device configured to process and handle visual data.

In one embodiment, camera 312 is configured to capture images, such as images of a target object (e.g., a part to be assembled in industrial facility 101) whose location is known via the RFID tag attached to the object. Such captured images may then be transmitted to robot controller 102, such as via wireless communication interface 308 and network 103, which uses image processing techniques to identify the object from the captured images.

In one embodiment, robot controller 102 uses a deep learning model for object identification/classification. For example, in one embodiment, robot controller 102 utilizes deep learning models, such as convolutional neural networks, to learn an object's inherent features in order to identify that object from the images captured by camera 312. For example, the deep learning model (e.g., convolutional neural network) can learn to identify the differences between part A and part B by analyzing thousands of training images of parts A and B and learning the features that make parts A and B different.

In one embodiment, robot controller 102 uses a machine learning technique for object identification from the images captured by camera 312. Examples of machine learning techniques include the Histogram of Oriented Gradients (HOG) feature extraction with a support vector machines (SVM) machine learning model. In another example, the viola-jones algorithms is utilized to recognize a variety of objects.

In one embodiment, in order to perform object identification using a machine learning technique, relevant features in each image (or video) in a collection of images (or video) are selected. For example, a feature extraction algorithm may extract edge or corner features that can be used to differentiate between classes (types of objects, such as parts A, B, and C) in the data. These features are added to the machine learning model, which will separate these features into their distinct categories. Such information may then be used to analyze and classify new objects.

In one embodiment, such images of the various objects (e.g., parts, other robots 104, etc.) in industrial facility 101 captured by camera 312 may be analyzed by robot controller 102 to extract information about the position and orientation of the objects in the physical environment of industrial facility 101. In one embodiment, such information may be used to generate a three-dimensional map 306 of the environment of industrial facility 101 defining floor plan 307, which can be used to plan the movement of robotic arm 201 of robot 104 and avoid collisions with other objects (e.g., other robots 104).

Furthermore, in one embodiment, such extracted information about the position and orientation of the objects in the physical environment of industrial facility 101 may be used to identify the positions of the objects (e.g., parts, robots, etc.) within the physical environment of industrial facility 101. As a result, the relative positions of the objects may be determined.

Examples of camera 312 can include, but are not limited to, Zivid® 2 3D camera, Mech-Eye® 3D camera, FH-SMD 3D camera by Omron®, etc.

As discussed above, in one embodiment, vision system 314 processes and handles visual data, such as the visual data captured by camera 312. In one embodiment, such processing may include image processing techniques to identify the object from images captured by camera 312 in a similar fashion as discussed above in connection with robot controller 102 identifying the object from images captured by camera 312 using image processing techniques. Examples of vision system 314 can include, but are not limited to, OV20i by Overview®, Keyence® CV-X series vision system, etc.

In one embodiment, vision system 314 utilizes vision software 313 to detect and track objects based on the images of objects captured by camera 312. In one embodiment, such software performs image processing techniques as discussed above. Examples of vision software 313 can include, but are not limited to, Mech-Vision® machine vision software, Zebra Aurora™, etc.

Additionally, base 301 includes a vibrating mechanism 315, such as a spindle, configured to generate vibrations to detach a target object from robotic arm 201 upon robot 104 moving the target object to the desired location. In one embodiment, such vibrations are controlled programmatically, such as by robot controller 102 via base controller 303 or directly by base controller 303. In one embodiment, such vibrations are used to detach the target object from the sticky adhesive 203. In one embodiment, the intensity and frequency of the vibrations are adjusted based on the attributes (e.g., shape, dimensions, texture, weight, chemical properties, etc.) of the target object and the strength or adhesion level of adhesive 203. In one embodiment, such vibrations are gentle enough so as to not cause damage to the target object or the surrounding environment yet strong enough to cause the release of the target object from robotic arm 201. In one embodiment, the vibrations are controlled programmatically based on the attributes (e.g., shape, dimensions, texture, weight, chemical properties, etc.) of the target object and the strength or adhesion level of adhesive 203 using a data structure (e.g., table) that includes the level of vibrations proportional to the attributes of the objects as well as the strength or adhesion level of adhesive 203. In one embodiment, such a data structure resides within the storage device of robot controller 102. In one embodiment, such a data structure is populated by an expert.

Examples of vibrating mechanism 315 can include, but are not limited to, Zimmer® HFL04-103-01-A-00 machine spindle and the like.

Referring now to the components of payload 302, item sensors 317 provide signals to payload controller 316 and, possibly, directly to base controller 303 by means of API 310, which permit payload controller 316 and/or base controller 303 to make programmatic decisions about whether robot 104 has completed an assignment or is available to acquire more items.

In one embodiment, payload sensors 318 may include, for example, temperature or gas sensors, cameras, RFID readers, environmental sensors, wireless Ethernet sniffing sensors, etc. In one embodiment, payload sensors 318 may be used to provide information about the state of payload 302, the state of the physical environment, the proximity of robot 104 to physical objects, including other robots 104, or some combination of all of this information.

In one embodiment, payload 302 includes robotic arms 201 configured to appropriately grip objects by secreting adhesive 203 in selected pores 202 of robotic arm 201. In one embodiment, robotic arms 201 are programmed via commands received by base controller 303 and/or payload controller 316 via robot controller 102.

In one embodiment, payload 302 may also include a wireless communications interface 319, which sends information to and receives information from other devices or networks, such as from robot controller 102.

In one embodiment, payload controller 316 processes command and operation signals coming into payload 302 and generally controls and coordinates all of the functions performed by payload 302.

A discussion regarding the software components used by robot controller 102 to enable robots 104 to appropriately grip objects using a robotic arm (e.g., robotic arm 201) that intelligently secretes an adhesive (e.g., adhesive 203) in selected pores (e.g., pores 202) of the robotic arm is provided below in connection with FIG. 4.

Figure 4:
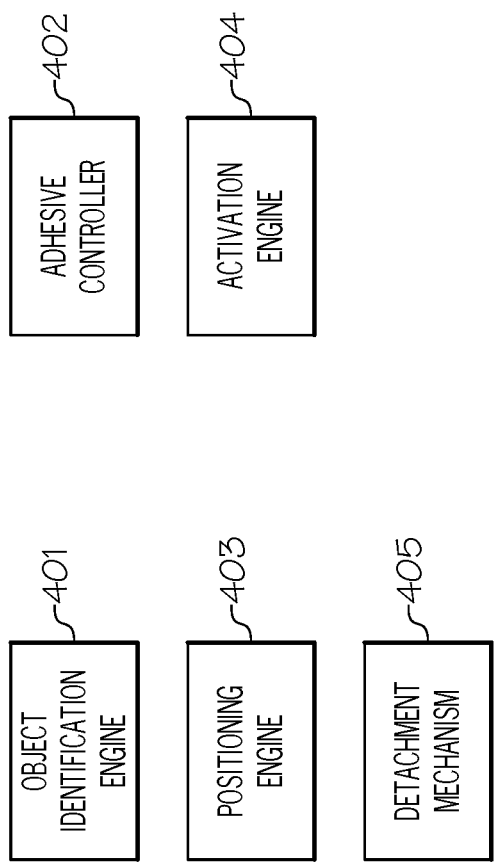
FIG. 4 is a diagram of the software components used by the robot controller for enabling robots to appropriately grip objects using a robotic arm that intelligently secretes an adhesive in selected pores of the robotic arm in accordance with an embodiment of the present disclosure.

FIG. 4 is a diagram of the software components used by robot controller 102 for enabling robots 104 to appropriately grip objects using a robotic arm (e.g., robotic arm 201) that intelligently secretes an adhesive (e.g., adhesive 203) in selected pores (e.g., pores 202) of the robotic arm in accordance with an embodiment of the present disclosure.

Referring to FIG. 4, in conjunction with FIGS. 1-3, robot controller 102 includes an object identification engine 401 configured to identify the target object (e.g., circuit board, brake pads, brake rotors, brake shoes, wheel cylinders, wheel bearings, wheel studs, etc.) to be gripped by robotic arm 201 of robot 104, such as a robot located in industrial facility 101.

In one embodiment, robot controller 102 may instruct (via commands) a particular robot 104 in industrial facility 101 to move to a designated location as identified in floor plan 307 to capture images of a target object (e.g., circuit board) via camera 312. Object identification engine 401 may then use image processing techniques to analyze the captured images of the target object (e.g., element 206) to identify the target object based on its features, such as shape and color.

For example, in one embodiment, object identification engine 401 uses a deep learning model for object identification/classification. For example, object identification engine 401 utilizes deep learning models, such as convolutional neural networks, to learn an object's inherent features in order to identify that object from the images captured by camera 312. For instance, the deep learning model (e.g., convolutional neural network) can learn to identify the differences between part A and part B by analyzing thousands of training images of parts A and B and learning the features that make parts A and B different.

In one embodiment, object identification engine 401 uses a machine learning technique for object identification from the images captured by camera 312. Examples of machine learning techniques include the Histogram of Oriented Gradients (HOG) feature extraction with a support vector machines (SVM) machine learning model. In another example, the viola-jones algorithms is utilized to recognize a variety of objects.

In one embodiment, in order to perform object identification using a machine learning technique, relevant features in each image (or video) in a collection of images (or video) are selected. For example, a feature extraction algorithm may extract edge or corner features that can be used to differentiate between classes (types of objects, such as parts A, B, and C) in the data. These features are added to the machine learning model, which will separate these features into their distinct categories. Such information may then be used to analyze and classify new objects.

In one embodiment, an expert may instruct object identification engine 401 of robot controller 102 as to which robots 104 will be programmed to grip which particular object (e.g., circuit board of type A), such as based on the particular robotic arms 201 attached to such robots 104.

In one embodiment, information as to which particular target objects are to be gripped by which robots 104 (via robotic arm 201) is stored in a data structure (e.g., table), which may reside within the storage device of robot controller 102. In one embodiment, each robot 104 is uniquely identified via a serial number. As a result, in such a data structure, the robot identified via a serial number is associated with one or more target objects to be gripped. In one embodiment, such target objects are also identified in the data structure via a unique serial number. In one embodiment, such a data structure is populated by an expert. As a result, in one embodiment, object identification engine 401 is configured to identify a target object to be gripped by robotic arm 201 of a particular robot 104 based on extracting such information from such a data structure.

In one embodiment, object identification engine 401 identifies the target object to be gripped by robotic arm 201 of robot 104 based on criteria provided by an user. For example, the user may specify that robot 104 should pick up all objects of a certain size, weight, or shape. Upon identifying objects that meet such criteria, such as by using the image processing techniques on the captured images of such objects as discussed above, such objects correspond to the target objects to be gripped by robot 104.

Alternatively, the criteria may correspond to a specific task that robot 104 is required to perform, such as picking up all objects on a particular shelf or table. Upon identifying such a shelf or table, such as by using the image processing techniques on the captured images of the shelf or table as discussed above, the objects on such a shelf or table correspond to the target objects to be gripped by robot 104.

Upon identifying the target object (e.g., circuit board of type A) to be gripped by robotic arm 201 of robot 104, object identification engine 401 is configured to determine the attributes of the identified target object. Attributes, as used herein, refer to the quality or feature regarded as a characteristic or inherent part of the target object. Examples of attributes can include, but are not limited to, shape, dimensions, texture, weight, chemical properties, etc.

In one embodiment, upon identifying the target object, attributes of the target object (e.g., shape, dimensions, texture, weight, chemical properties, etc.) may be obtained by object identification engine 401 accessing a data structure (e.g., table) storing attributes for the various objects that may be gripped by robots 104 in industrial facility 101. In one embodiment, such a data structure resides within the storage device of robot controller 102. In one embodiment, such a data structure is populated by an expert.

Robot controller 102 further includes adhesive controller 402 configured to select the pore(s) 202 of robotic arm 201 to be enabled to secrete adhesive 203 based on the attributes of the target object (e.g., circuit board of type A). As previously discussed, pores 202 are openings located on the surface of robotic arm 201. In one embodiment, pores 202 are connected through channel 205 within robotic arm 201, which allows for the flow of adhesive 203 from a container 204 or reservoir attached to robotic arm 201. In one embodiment, adhesive 203 is stored in container 204 until it is ready for use by robotic arm 201.

In one embodiment, the use of pores 202 of robotic arm 201 allow for precise and controlled application of adhesive 203, where channel 205 within robotic arm 201 ensures that adhesive 203 is delivered efficiently and accurately. Examples of channel 205 can include, but are not limited to, flow channels, such as hydrodynamic channels.

In one embodiment, adhesive 203 is a non-metallic substance that when applied to one or more surfaces of an object (e.g., a part) binds the object (e.g., object 206) to robotic arm 201 and resists their separation. In one embodiment, such an adhesive 203 is a nonreactive adhesive which forms a bond when pressure is applied to bond the adhesive with a surface of the target object (e.g., circuit board of type A).

In one embodiment, adhesive 203 is a pressure-sensitive adhesive. In such an adhesive, the degree of such a bond is influenced by an amount of adhesive 203 and the amount of pressure which is used to apply adhesive 203 to the surface of the target object (e.g., circuit board of type A). In one embodiment, such an adhesive (pressure-sensitive adhesive) reduces or loses their tack at low temperatures and reduces their shear holding ability at high temperatures. In one embodiment, such an adhesive is designed to form a temporary bond and can be removed without leaving residue on the adherend.

In one embodiment, the composition of pressure-sensitive adhesives is based on an elastomer compounded with a suitable tackifier (e.g., a rosin ester). In one embodiment, an example of such a pressure-sensitive adhesive is styrene block copolymers. Examples of adhesive 203 that are a pressure-sensitive adhesive can include, but are not limited to, rubber-based adhesives (e.g., styrene butadiene (SBR), nitrile rubber (NBR), polychloroprene (Neoprene) and silicones), acrylic-based adhesives (resin-based adhesive that is comprised of acrylic or methylacrylic polymers), and silicone-based adhesives (versatile water resistant polymer whose primary ingredient is silica). Other examples of pressure-sensitive adhesives can include, but are not limited to, gummy glue, Zip Grip TE 2400, Zip Grip GPE 3, etc.

As discussed above, adhesive controller 402 is configured to select the pore(s) 202 of robotic arm 201 to be enabled to secrete adhesive 203 based on the attributes of the target object (e.g., circuit board of type A). In one embodiment, adhesive controller 402 selects the pore(s) 202 of robotic arm 201 to be enabled to secrete adhesive 203 based on a data structure (e.g., table) that includes a listing of designate pores 202 to be selected to be enabled to secrete adhesive 203 based on the attributes of the target object (e.g., circuit board of type A), such as the shape, dimensions, texture, weight, chemical properties, etc. For instance, the data structure may indicate that the first and fourth pores 202 of robotic arm 201 are to be enabled to secrete adhesive 203 for a target object (e.g., element 206) with a rectangular shape, dimensions of 24 inches×18 inches, weight of 0.01 ounces, and a chemical composition of 40% metals, 30% ceramics and 30% plastics. In one embodiment, such a data structure is stored in a storage device of robot controller 102. In one embodiment, such a data structure is populated by an expert.

In one embodiment, adhesive controller 402 is further configured to determine the adhesion level corresponding to the amount of adhesive 203 to be secreted by the selected pores 202 of robotic arm 201 based on the attributes of the target object. For example, a target object with a greater dimension, shape and/or weight may require a greater amount of adhesive 203 to be secreted by the selected pores 202 in order to securely grip the target object.

In one embodiment, adhesive controller 402 determines the adhesion level of the adhesive 203 to be secreted by the selected pores 202 of robotic arm 201 based on a data structure (e.g., table) that includes a listing of the adhesion level of adhesive 203 to be secreted by the selected pores 202 (e.g., pores 1 and 3) of robotic arm 201 based on the attributes of the target object (e.g., circuit board of type A), such as the shape, dimensions, texture, weight, chemical properties, etc. For instance, the data structure may indicate that the adhesion level is a particular volume (e.g., 0.2 ml) of adhesion 203 to be utilized by the first and fourth pores 202 of robotic arm 201 to enable robotic arm 201 to appropriately grip a target object (e.g., circuit board) with a rectangular shape, dimensions of 24 inches×18 inches, weight of 0.01 ounces, and a chemical composition of 40% metals, 30% ceramics and 30% plastics. In one embodiment, such a data structure is stored in a storage device of robot controller 102. In one embodiment, such a data structure is populated by an expert.

Furthermore, in one embodiment, adhesive controller 402 controls the fluidity of adhesive 203 based on the attributes of the identified target object. For example, the fluidity of adhesive 203 may be determined based on a data structure (e.g., table) that includes a listing of the fluidity levels of the adhesive based on the attributes of the target object (e.g., circuit board of type A), such as the shape, dimensions, texture, weight, chemical properties, etc. For instance, the data structure may indicate that the fluidity of adhesive 203 is to be adjusted by activating a heating element for 10 seconds or mixing a particular chemical with adhesive 203 for a target object with the attributes of a rectangular shape, dimensions of 24 inches×18 inches, weight of 0.01 ounces, and a chemical composition of 40% metals, 30% ceramics and 30% plastics. In one embodiment, such a data structure is stored in a storage device of robot controller 102. In one embodiment, such a data structure is populated by an expert.

As discussed above, in one embodiment, the fluidity of adhesive 203 is controlled by mixing a chemical(s) with adhesive 203 in container 204 to change the viscosity and flow characteristics of adhesive 203. Examples of such chemicals can include, but are not limited to, amorphous silicon dioxide, precipitated calcium carbonate, kaolin, bentonite, talc, xanthan gum, sodium carboxymethylcellulose, etc.

In another embodiment, the fluidity of adhesive 203 is controlled via the use of a pump. In a further embodiment, the fluidity of adhesive 203 is controlled by using a heating element to increase the temperature of adhesive 203 and reduce its viscosity. Examples of a heating element can include, but are not limited to, silicone rubber fiberglass insulated flexible heater (e.g., Omega® SRFGA-209/10-P), etc. Alternatively, a cooling element is used to reduce the temperature of adhesive 203 and increase its viscosity. Examples of a cooling element can include, but are not limited to, Kenics® heat exchanger and the like.

In one embodiment, the fluidity of adhesive 203 is controlled using such mechanisms as discussed above based on the attributes of the target object (e.g., door panel). For example, for a large object, a larger number of pores 202 will be activated to secrete adhesive 203. In order for a larger number of pores 202 to be activated to secrete adhesive 203, the viscosity of adhesive 203 may need to be reduced, such as by increasing the temperature of adhesive 203 stored in container 204.

Robot controller 102 additionally includes positioning engine 403 configured to determine the relative position of the target object with respect to robotic arm 201 of robot 104.

In one embodiment, such a relative position is determined using a depth sensor 309 (e.g., LiDAR sensor) on robot 104. As previously discussed, depth sensor 309, such as a LiDAR sensor, determines a distance between robotic arm 201 of robot 104 and the target object, which is identified by object identification engine 401, by emitting short pulses of laser light and measuring the time it takes for the light to be reflected by the target object. Such information is used to calculate the distance between the sensor and the target object. In one embodiment, LiDAR sensors may operate in a fixed direction (e.g., vertical) or it may scan multiple directions. Examples of depth sensor 309 can include, but are not limited to, Leddar® Pixell LiDAR sensor, RPLIDAR S2, 360 Degree LiDAR by Studica® Robotics, Garmin® LIDAR-Lite V3, etc.

In one embodiment, positioning engine 403 instructs robot 104 to position robotic arm 201 to grip the target object based on the determined relative positive of the target object with respect to robotic arm 201. For example, such instructions may be issued to locomotion system 305 either directly or indirectly via base controller 303 for making robotic arm 201 move. For example, in one embodiment, positioning engine 403 moves robotic arm 201 by sending commands to the motors through locomotion system 305 either directly or indirectly, such as via base controller 303. In one embodiment, such motors move independently of one another at various speeds to drive robotic arm 201 in whichever direction positioning engine 403 requests.

In one embodiment, positioning engine 403 builds and trains a model to correctly position robotic arm 201 to grip a target object based on the determined relative position of the target object (target object previously identified with the determined attributes) with respect to robotic arm 201.

In one embodiment, the model is trained to predict such positioning based on a sample data set that includes the correct instructions to be issued to robot 104, such as locomotion system 305, to correctly position robotic arm 201 to grip a target object based on various relative positions of various target objects with various attributes with respect to robotic arm 201. Such a sample data set may be stored in a data structure (e.g., table) residing within the storage device of robot controller 102. In one embodiment, such a data structure is populated by an expert.

Furthermore, in one embodiment, the sample data set discussed above is referred to herein as the "training data," which is used by a machine learning algorithm to make predictions or decisions as to the correct instructions to be issued to robot 104, such as locomotion system 305, to correctly position robotic arm 201 to grip a target object based on the relative position of the target object with respect to robotic arm 201. The algorithm iteratively makes predictions on the training data as to the correct instructions to be issued to robot 104, such as locomotion system 305, to correctly position robotic arm 201 to grip a target object until the predictions achieve the desired accuracy as determined by an expert. Examples of such learning algorithms include nearest neighbor, Naïve Bayes, decision trees, linear regression, support vector machines, and neural networks.

After such a model is trained, it may be utilized by positioning engine 403 to correctly instruct robot 104, such as locomotion system 305, to correctly position robotic arm 201 to grip the identified target object with the determined attributes based on the determined relative position of the target object with respect to robotic arm 201.

Robot controller 102 additionally includes an activation engine 404 configured to activate the selected pore(s) 202 of robotic arm 201 to secrete adhesive 203 according to the determined adhesion level to grip the target object upon positioning robotic arm 201 to grip the target object. While the following discusses gripping a single target object, it is noted that the principles of the present disclosure may be utilized to grip multiple target objects concurrently. A person of ordinary skill in the art would be capable of applying the principles of the present disclosure to such implementations. Furthermore, embodiments applying the principles of the present disclosure to such implementations would fall within the scope of the present disclosure.

As discussed above, in one embodiment, pores 202 of robotic arm 201 have programmatic controlled valves so that pores 202 can be opened programmatically, such as by activation engine 404. In one embodiment, such valves correspond to flow control valves (e.g., ASCO™ series 226 and the like) or pneumatic valves (e.g., robot-arm-mounted electrically operated air on/off valves by McMaster-Carr® and the like). In one embodiment, these valves are controlled by activation engine 404, which decides when to open or close the valves. The programmatic control of the valves allows robotic arm 201 to apply adhesive 203 in a precise and controlled manner. By opening and closing the valves at the right times, robotic arm 201 will be able to apply adhesive 203 via pores 202 exactly where needed, with the right amount of pressure and for the right length of time to ensure that adhesive 203 is applied consistently and efficiently.

In one embodiment, the valve(s) for the selected pore(s) 202 of robotic arm 201 are activated by activation engine 404 by applying power to the respective valve(s) and deactivated (closed) when activation engine 404 does not apply power (e.g., spring closes the valve when power is not applied). In one embodiment, the valve(s) for the selected pore(s) 202 of robotic arm 201 are activated by activation engine 404 by driving such a valve(s) using a DC or AC voltage source.

Furthermore, in one embodiment, upon gripping the target object by activating pore(s) 202 of robotic arm 201 to secrete adhesive 203 according to the determined adhesion level, positioning engine 403 instructs robot 104 to lift the target object and move the target object to a desired location, such as to a location where the gripped target object is to be used in combination with another target object (e.g., part) to enable the assembling of a final product or a component of the final product.

In one embodiment, the desired location is pre-determined, such as by an expert. In one embodiment, the exact location of such a desired location is determined based on floor plan 307. For example, such a desired location may correspond to a job location, such as a location to assemble a final product.

In one embodiment, positioning engine 403 instructs base controller 303 to generate a command signal that causes onboard navigation system 304 to start driving robot 104 to the specified destination. In one embodiment, onboard navigation system 304 operates in combination with locomotion system 305 to drive robot 104 from its current location to the desired location along the established movement path as determined by floor plan 307.

In one embodiment, locomotion system 305 includes the hardware and electronics necessary for making robot 104 move including, for example, motors, wheels, feedback mechanisms for the motors and wheels, and encoders. In one embodiment, onboard navigation system 304 "drives" robot 104 by sending commands down to the wheels and motors through locomotion system 305.

Furthermore, in one embodiment, robot controller 102 includes a detachment mechanism 405 configured to instruct robot 104 to detach the target object from robotic arm 201 upon moving the target object to the desired location.

In one embodiment, the location of the target object is determined to have reached the desired location based on the location of the target object, which is known via the RFID tag attached to the object, matching the desired location.

In one embodiment, the current location of robot 104 in industrial facility 101 is determined based on location information (e.g., GPS (Global Positioning System) data) being provided to robot controller 102 via the attached IoT sensor 105. As a result, the location of the target object is determined to have reached the desired location based on the location of robot 104 matching the desired location.

In one embodiment, detachment mechanism 405 instructs robot 104 to detach the target object from robotic arm 201 upon moving the target object to the desired location by activating vibrating mechanism 315, such as a spindle, to generate vibrations to detach the target object from robotic arm 201 upon robot 104 moving the target object to the desired location. In one embodiment, such vibrations are controlled programmatically, such as by detachment mechanism 405 via base controller 303. In one embodiment, such vibrations are used to detach the target object from the sticky adhesive 203. In one embodiment, the intensity and frequency of the vibrations are adjusted based on the attributes (e.g., shape, dimensions, texture, weight, chemical properties, etc.) of the target object and the strength or adhesion level of adhesive 203. In one embodiment, such vibrations are gentle enough so as to not cause damage to the target object or the surrounding environment yet strong enough to cause the release of the target object from robotic arm 201. In one embodiment, the vibrations are controlled programmatically based on the attributes (e.g., shape, dimensions, texture, weight, chemical properties, etc.) of the target object and the strength of adhesive 203 using a data structure (e.g., table) that includes the level of vibrations proportional to the attributes of the objects as well as the strength or adhesion level of adhesive 203. In one embodiment, such a data structure resides within the storage device of robot controller 102. In one embodiment, such a data structure is populated by an expert.

In one embodiment, detachment mechanism 405 programmatically controls the vibrations to be generated by vibrating mechanism 315 by applying or not applying power to vibrating mechanism 315. In one embodiment, detachment mechanism 405 programmatically controls the vibrations to be generated by vibrating mechanism 315 using a DC or AC voltage source. In one embodiment, detachment mechanism 405 controls the intensity and frequency of the vibrations based on the voltage level of the DC or AC voltage source. For example, the higher the DC or AC voltage source, the greater the intensity and frequency of the vibrations and vice-versa.

Examples of vibrating mechanism 315 can include, but are not limited to, Zimmer® HFL04-103-01-A-00 machine spindle and the like.

In one embodiment, upon detaching the target object from robotic arm 201, any adhesive residue remaining on robotic arm 201 may be cleaned. In one embodiment, the cleaning method is selected based on the type of adhesive 203 used and the material of robotic arm 201. For example, if adhesive 203 is water-soluble, then robotic arm 201 may be cleaned with water or a water-based solution. Alternatively, if adhesive 203 is not water-soluble, then a solvent-based solution may be used for cleaning robotic arm 201.

In one embodiment, a cleaning mechanism may be integrated with the components of robot 104 as shown in FIG. 3 and can be programmed to clean robotic arm 201 after each use or at regular intervals. In one embodiment, the cleaning process is automated, and the cleaning solution is dispensed through the opening pores 202 of robotic arm 201. Once the cleaning process is complete, robotic arm 201 is ready for its next use.

A further description of these and other features is provided below in connection with the discussion of the method for enabling robots to appropriately grip objects using a robotic arm that intelligently secretes an adhesive in selected pores of the robotic arm.

Prior to the discussion of the method for enabling robots to appropriately grip objects using a robotic arm that intelligently secretes an adhesive in selected pores of the robotic arm, a description of the hardware configuration of robot controller 102 (FIG. 1) is provided below in connection with FIG. 5.

Figure 5:
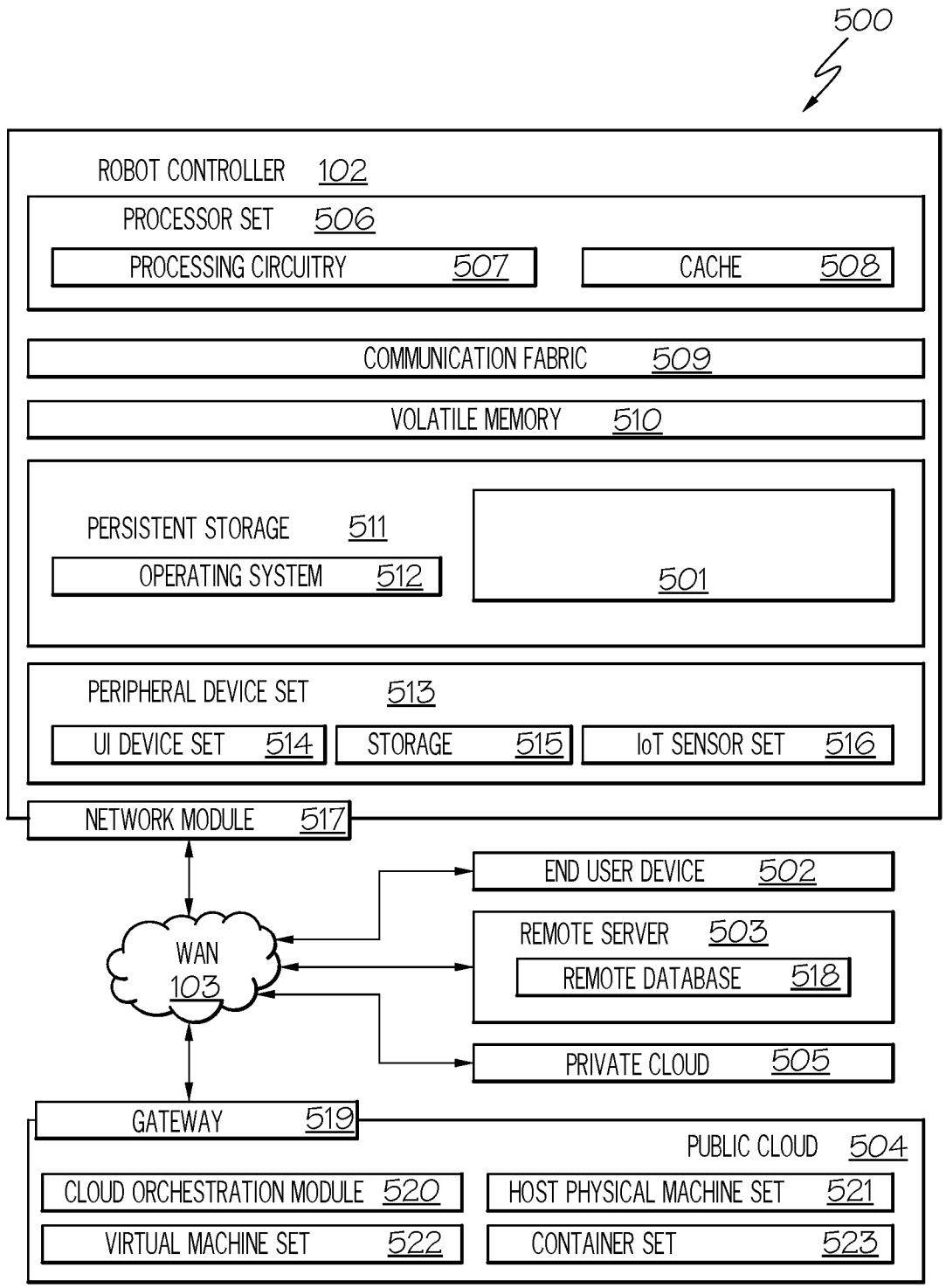
FIG. 5 illustrates an embodiment of the present disclosure of the hardware configuration of the robot controller which is representative of a hardware environment for practicing the present disclosure.

Referring now to FIG. 5, in conjunction with FIG. 1, FIG. 5 illustrates an embodiment of the present disclosure of the hardware configuration of robot controller 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code (computer code for enabling robots to appropriately grip objects using a robotic arm that intelligently secretes an adhesive in selected pores of the robotic arm, which is stored in block 501) involved in performing the disclosed methods, such as enabling robots to appropriately grip objects using a robotic arm that intelligently secretes an adhesive in selected pores of the robotic arm. In addition to block 501, computing environment 500 includes, for example, robot controller 102, network 103, such as a wide area network (WAN), end user device (EUD) 502, remote server 503, public cloud 504, and private cloud 505. In this embodiment, robot controller 102 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT) sensor set 516), and network module 517. Remote server 503 includes remote database 518. Public cloud 504 includes gateway 519, cloud orchestration module 520, host physical machine set 521, virtual machine set 522, and container set 523.

Robot controller 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically robot controller 102, to keep the presentation as simple as possible. Robot controller 102 may be located in a cloud, even though it is not shown in a cloud in FIG. 5. On the other hand, robot controller 102 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto robot controller 102 to cause a series of operational steps to be performed by processor set 506 of robot controller 102 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 508 and the other storage media discussed below. The program instructions, and associated data, are accessed by processor set 506 to control and direct performance of the disclosed methods. In computing environment 500, at least some of the instructions for performing the disclosed methods may be stored in block 501 in persistent storage 511.

Communication fabric 509 is the signal conduction paths that allow the various components of robot controller 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In robot controller 102, the volatile memory 510 is located in a single package and is internal to robot controller 102, but, alternatively or additionally, the volatile memory may be distributed over multiple packages and/or located externally with respect to robot controller 102.

Persistent Storage 511 is any form of non-volatile storage for computers that is now known or to be developed in the future. The non-volatility of this storage means that the stored data is maintained regardless of whether power is being supplied to robot controller 102 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the disclosed methods.

Peripheral device set 513 includes the set of peripheral devices of robot controller 102. Data communication connections between the peripheral devices and the other components of robot controller 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where robot controller 102 is required to have a large amount of storage (for example, where robot controller 102 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows robot controller 102 to communicate with other computers through WAN 103. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the disclosed methods can typically be downloaded to robot controller 102 from an external computer or external storage device through a network adapter card or network interface included in network module 517.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates robot controller 102), and may take any of the forms discussed above in connection with robot controller 102. EUD 502 typically receives helpful and useful data from the operations of robot controller 102. For example, in a hypothetical case where robot controller 102 is designed to provide a recommendation to an end user, this recommendation would typically be communicated from network module 517 of robot controller 102 through WAN 103 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to robot controller 102. Remote server 503 may be controlled and used by the same entity that operates robot controller 102. Remote server 503 represents the machine(s) that collect and store helpful and useful data for use by other computers, such as robot controller 102. For example, in a hypothetical case where robot controller 102 is designed and programmed to provide a recommendation based on historical data, then this historical data may be provided to robot controller 102 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIG. 4 to enable robots (e.g., robots 104) to appropriately grip objects using a robotic arm (e.g., robotic arm 201) that intelligently secretes an adhesive in selected pores (e.g., pores 202) of the robotic arm. In one embodiment, such components may be implemented in hardware. The functions discussed above performed by such components are not generic computer functions. As a result, robot controller 102 is a particular machine that is the result of implementing specific, non-generic computer functions.

In one embodiment, the functionality of such software components of robot controller 102, including the functionality for enabling robots (e.g., robots 104) to appropriately grip objects using a robotic arm (e.g., robotic arm 201) that intelligently secretes an adhesive in selected pores (e.g., pores 202) of the robotic arm, may be embodied in an application specific integrated circuit.

As stated above, in manufacturing processes, robotic systems (robots) are often used to automate repetitive, menial tasks, such as material handling and assembly. Robots provide numerous benefits in metal and plastic manufacturing, including improved efficiency, precision, and quality. They can perform tasks such as welding, cutting, assembly, shipping, handling raw materials, product packing, machining, and molding with a high degree of accuracy and repeatability, ensuring consistent production of high-quality parts. For this reason, multiple manufacturers are leveraging robotic automation for an increased number of tasks. In the manufacturing process, different types of metallic and non-metallic parts may be assembled using robots. Such parts may need to be gripped by the robots, such as on an assembly line. Some of these parts are delicate and need to be handled carefully. Furthermore, some of these parts may need to be extracted from a narrow passage. Hence, such parts may be difficult to be gripped by the robots, such as via grippers, robotic jaws, etc. By not being able to appropriately grip parts, such parts may end up being broken or not being placed in the appropriate position to be properly assembled with other parts.

The embodiments of the present disclosure provide a means for enabling robots to appropriately grip objects using a robotic arm that intelligently secretes an adhesive in selected pores of the robotic arm as discussed below in connection with FIG. 6.

Figure 6:
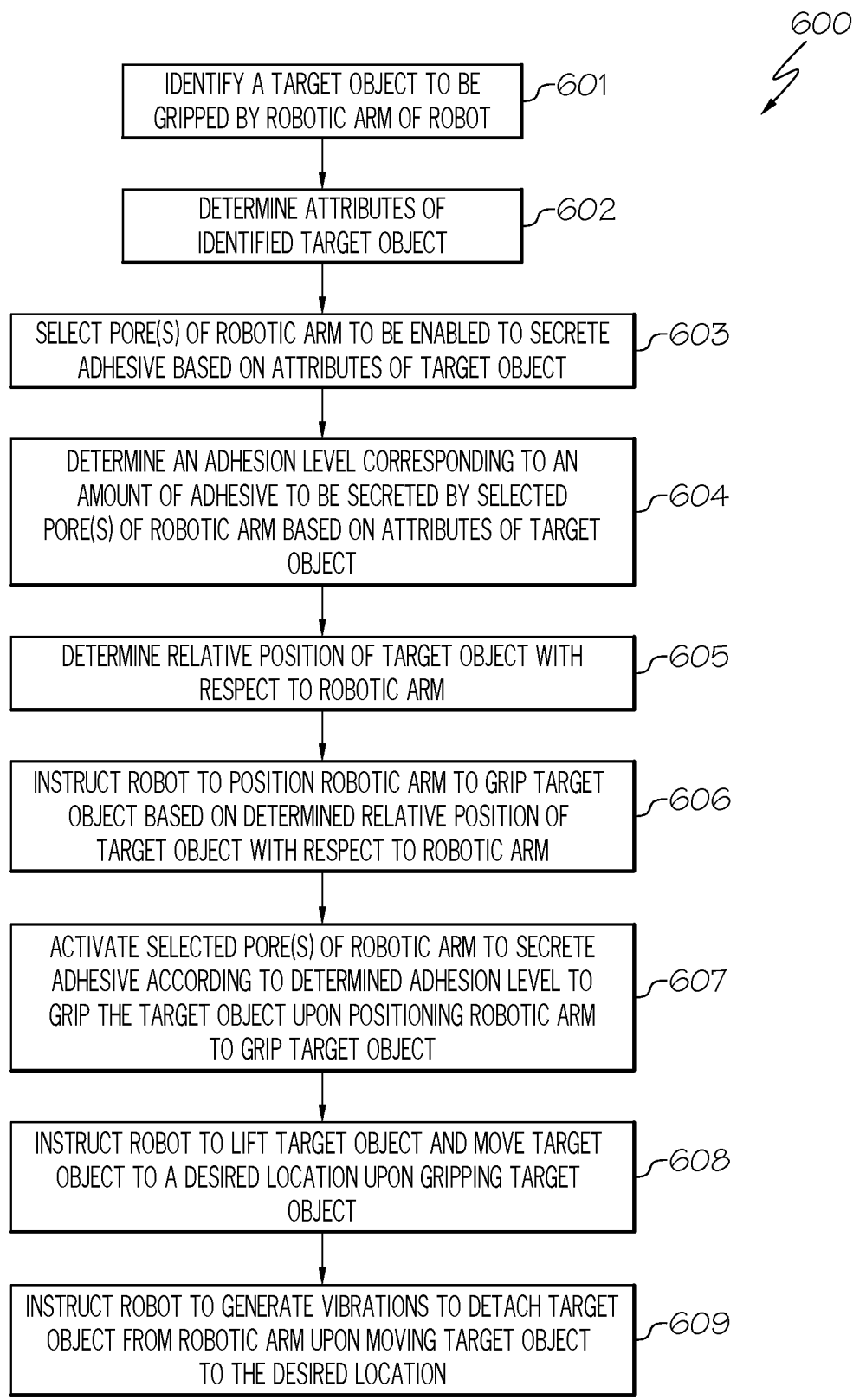
FIG. 6 is a flowchart of a method for enabling robots to appropriately grip objects using a robotic arm that intelli-

FIG. 6 is a flowchart of a method 600 for enabling robots (e.g., robots 104) to appropriately grip objects using a robotic arm (e.g., robotic arm 201) that intelligently secretes an adhesive (e.g., adhesive 203) in selected pores (e.g., pores 202) of the robotic arm in accordance with an embodiment of the present disclosure.

Referring to FIG. 6, in conjunction with FIGS. 1-5, in operation 601, an object identification engine 401 of robot controller 102 identifies a target object (e.g., circuit board, brake pads, brake rotors, brake shoes, wheel cylinders, wheel bearings, wheel studs, etc.) to be gripped by robotic arm 201 of robot 104.

As discussed above, in one embodiment, robot controller 102 may instruct (via commands) a particular robot 104 in industrial facility 101 to move to a designated location as identified in floor plan 307 to capture images of a target object (e.g., circuit board) via camera 312. Object identification engine 401 may then use image processing techniques to analyze the captured images of the target object (e.g., element 206) to identify the target object based on its features, such as shape and color.

For example, in one embodiment, object identification engine 401 uses a deep learning model for object identification/classification. For example, object identification engine 401 utilizes deep learning models, such as convolutional neural networks, to learn an object's inherent features in order to identify that object from the images captured by camera 312. For instance, the deep learning model (e.g., convolutional neural network) can learn to identify the differences between part A and part B by analyzing thousands of training images of parts A and B and learning the features that make parts A and B different.

In one embodiment, object identification engine 401 uses a machine learning technique for object identification from the images captured by camera 312. Examples of machine learning techniques include the Histogram of Oriented Gradients (HOG) feature extraction with a support vector machines (SVM) machine learning model. In another example, the viola-jones algorithms is utilized to recognize a variety of objects.

In one embodiment, in order to perform object identification using a machine learning technique, relevant features in each image (or video) in a collection of images (or video) are selected. For example, a feature extraction algorithm may extract edge or corner features that can be used to differentiate between classes (types of objects, such as parts A, B, and C) in the data. These features are added to the machine learning model, which will separate these features into their distinct categories. Such information may then be used to analyze and classify new objects.

In one embodiment, an expert may instruct object identification engine 401 of robot controller 102 as to which robots 104 will be programmed to grip which particular object (e.g., circuit board of type A), such as based on the particular robotic arms 201 attached to such robots 104.

In one embodiment, information as to which particular target objects are to be gripped by which robots 104 (via robotic arm 201) is stored in a data structure (e.g., table), which may reside within the storage device (e.g., storage device 511, 515) of robot controller 102. In one embodiment, each robot 104 is uniquely identified via a serial number. As a result, in such a data structure, the robot identified via a serial number is associated with one or more target objects to be gripped. In one embodiment, such target objects are also identified in the data structure via a unique serial number. In one embodiment, such a data structure is populated by an expert. As a result, in one embodiment, object identification engine 401 is configured to identify a target object to be gripped by robotic arm 201 of a particular robot 104 based on extracting such information from such a data structure.

In one embodiment, object identification engine 401 identifies the target object to be gripped by robotic arm 201 of robot 104 based on criteria provided by an user. For example, the user may specify that robot 104 should pick up all objects of a certain size, weight, or shape. Upon identifying objects that meet such criteria, such as by using the image processing techniques on the captured images of such objects as discussed above, such objects correspond to the target objects to be gripped by robot 104.

Alternatively, the criteria may correspond to a specific task that robot 104 is required to perform, such as picking up all objects on a particular shelf or table. Upon identifying such a shelf or table, such as by using the image processing techniques on the captured images of the shelf or table as discussed above, the objects on such a shelf or table correspond to the target objects to be gripped by robot 104.

In operation 602, upon identifying the target object (e.g., circuit board of type A) to be gripped by robotic arm 201 of robot 104, object identification engine 401 of robot controller 102 determines the attributes of the identified target object. Attributes, as used herein, refer to the quality or feature regarded as a characteristic or inherent part of the target object. Examples of attributes can include, but are not limited to, shape, dimensions, texture, weight, chemical properties, etc.

As stated above, in one embodiment, upon identifying the target object, attributes of the target object (e.g., shape, dimensions, texture, weight, chemical properties, etc.) may be obtained by object identification engine 401 accessing a data structure (e.g., table) storing attributes for the various objects that may be gripped by robots 104 in industrial facility 101. In one embodiment, such a data structure resides within the storage device (e.g., storage device 511, 515) of robot controller 102. In one embodiment, such a data structure is populated by an expert.

In operation 603, adhesive controller 402 of robot controller 102 selects the pore(s) 202 of robotic arm 201 to be enabled to secrete adhesive 203 based on the attributes of the target object (e.g., circuit board of type A).

As previously discussed, pores 202 are openings located on the surface of robotic arm 201. In one embodiment, pores 202 are connected through channel 205 within robotic arm 201, which allows for the flow of adhesive 203 from container 204 or reservoir attached to robotic arm 201. In one embodiment, adhesive 203 is stored in container 204 until it is ready for use by robotic arm 201.

In one embodiment, the use of pores 202 of robotic arm 201 allow for precise and controlled application of adhesive 203, where channel 205 within robotic arm 201 ensures that adhesive 203 is delivered efficiently and accurately. Examples of channel 205 can include, but are not limited to, flow channels, such as hydrodynamic channels.

In one embodiment, adhesive 203 is a non-metallic substance that when applied to one or more surfaces of an object (e.g., a part) binds the object (e.g., object 206) to robotic arm 201 and resists their separation. In one embodiment, such an adhesive 203 is a nonreactive adhesive which forms a bond when pressure is applied to bond the adhesive with a surface of the target object (e.g., circuit board of type A).

In one embodiment, adhesive 203 is a pressure-sensitive adhesive. In such an adhesive, the degree of such a bond is influenced by an amount of adhesive 203 and the amount of pressure which is used to apply adhesive 203 to the surface of the target object (e.g., circuit board of type A). In one embodiment, such an adhesive (pressure-sensitive adhesive) reduces or loses their tack at low temperatures and reduces their shear holding ability at high temperatures. In one embodiment, such an adhesive is designed to form a temporary bond and can be removed without leaving residue on the adherend.

In one embodiment, the composition of pressure-sensitive adhesives is based on an elastomer compounded with a suitable tackifier (e.g., a rosin ester). In one embodiment, an example of such a pressure-sensitive adhesive is styrene block copolymers. Examples of adhesive 203 that are a pressure-sensitive adhesive can include, but are not limited to, rubber-based adhesives (e.g., styrene butadiene (SBR), nitrile rubber (NBR), polychloroprene (Neoprene) and silicones), acrylic-based adhesives (resin-based adhesive that is comprised of acrylic or methylacrylic polymers), and silicone-based adhesives (versatile water resistant polymer whose primary ingredient is silica). Other examples of pressure-sensitive adhesives can include, but are not limited to, gummy glue, Zip Grip TE 2400, Zip Grip GPE 3, etc.

As discussed above, adhesive controller 402 is configured to select the pore(s) 202 of robotic arm 201 to be enabled to secrete adhesive 203 based on the attributes of the target object (e.g., circuit board of type A). In one embodiment, adhesive controller 402 selects the pore(s) 202 of robotic arm 201 to be enabled to secrete adhesive 203 based on a data structure (e.g., table) that includes a listing of designate pores 202 to be selected to be enabled to secrete adhesive 203 based on the attributes of the target object (e.g., circuit board of type A), such as the shape, dimensions, texture, weight, chemical properties, etc. For instance, the data structure may indicate that the first and fourth pores 202 of robotic arm 201 are to be enabled to secrete adhesive 203 for a target object (e.g., element 206) with a rectangular shape, dimensions of 24 inches×18 inches, weight of 0.01 ounces, and a chemical composition of 40% metals, 30% ceramics and 30% plastics. In one embodiment, such a data structure is stored in a storage device (e.g., storage device 511, 515) of robot controller 102. In one embodiment, such a data structure is populated by an expert.

In operation 604, adhesive controller 402 of robot controller 102 determines the adhesion level corresponding to the amount of adhesive 203 to be secreted by the selected pores 202 of robotic arm 201 based on the attributes of the target object. For example, a target object with a greater dimension, shape and/or weight may require a greater amount of adhesive 203 to be secreted by the selected pores 202 in order to securely grip the target object.

As discussed above, in one embodiment, adhesive controller 402 determines the adhesion level of the adhesive 203 to be secreted by the selected pores 202 of robotic arm 201 based on a data structure (e.g., table) that includes a listing of the adhesion level of adhesive 203 to be secreted by the selected pores 202 (e.g., pores 1 and 3) of robotic arm 201 based on the attributes of the target object (e.g., circuit board of type A), such as the shape, dimensions, texture, weight, chemical properties, etc. For instance, the data structure may indicate that the adhesion level is a particular volume (e.g., 0.2 ml) of adhesion 203 to be utilized by the first and fourth pores 202 of robotic arm 201 to enable robotic arm 201 to appropriately grip a target object (e.g., circuit board) with a rectangular shape, dimensions of 24 inches×18 inches, weight of 0.01 ounces, and a chemical composition of 40% metals, 30% ceramics and 30% plastics. In one embodiment, such a data structure is stored in a storage device (e.g., storage device 511, 515) of robot controller 102. In one embodiment, such a data structure is populated by an expert.

Furthermore, in one embodiment, adhesive controller 402 controls the fluidity of adhesive 203 based on the attributes of the identified target object. For example, the fluidity of adhesive 203 may be determined based on a data structure (e.g., table) that includes a listing of the fluidity levels of the adhesive based on the attributes of the target object (e.g., circuit board of type A), such as the shape, dimensions, texture, weight, chemical properties, etc. For instance, the data structure may indicate that the fluidity of adhesive 203 is to be adjusted by activating a heating element for 10 seconds or mixing a particular chemical with adhesive 203 for a target object with the attributes of a rectangular shape, dimensions of 24 inches×18 inches, weight of 0.01 ounces, and a chemical composition of 40% metals, 30% ceramics and 30% plastics. In one embodiment, such a data structure is stored in a storage device (e.g., storage device 511, 515) of robot controller 102. In one embodiment, such a data structure is populated by an expert.

As discussed above, in one embodiment, the fluidity of adhesive 203 is controlled by mixing a chemical(s) with adhesive 203 in container 204 to change the viscosity and flow characteristics of adhesive 203. Examples of such chemicals can include, but are not limited to, amorphous silicon dioxide, precipitated calcium carbonate, kaolin, bentonite, talc, xanthan gum, sodium carboxymethylcellulose, etc.

In another embodiment, the fluidity of adhesive 203 is controlled via the use of a pump. In a further embodiment, the fluidity of adhesive 203 is controlled by using a heating element to increase the temperature of adhesive 203 and reduce its viscosity. Examples of a heating element can include, but are not limited to, silicone rubber fiberglass insulated flexible heater (e.g., Omega® SRFGA-209/10-P), etc. Alternatively, a cooling element is used to reduce the temperature of adhesive 203 and increase its viscosity. Examples of a cooling element can include, but are not limited to, Kenics® heat exchanger and the like.

In one embodiment, the fluidity of adhesive 203 is controlled using such mechanisms as discussed above based on the attributes of the target object (e.g., door panel). For example, for a large object, a larger number of pores 202 will be activated to secrete adhesive 203. In order for a larger number of pores 202 to be activated to secrete adhesive 203, the viscosity of adhesive 203 may need to be reduced, such as by increasing the temperature of adhesive 203 stored in container 204.

In operation 605, positioning engine 403 of robot controller 102 determines the relative position of the target object with respect to robotic arm 201 of robot 104.

As stated above, in one embodiment, such a relative position is determined using a depth sensor 309 (e.g., LiDAR sensor) on robot 104. As previously discussed, depth sensor 309, such as a LiDAR sensor, determines a distance between robotic arm 201 of robot 104 and the target object, which is identified by object identification engine 401, by emitting short pulses of laser light and measuring the time it takes for the light to be reflected by the target object. Such information is used to calculate the distance between the sensor and the target object. In one embodiment, LiDAR sensors may operate in a fixed direction (e.g., vertical) or it may scan multiple directions. Examples of depth sensor 309 can include, but are not limited to, Leddar® Pixell LiDAR sensor, RPLIDAR S2, 360 Degree LiDAR by Studica® Robotics, Garmin® LIDAR-Lite V3, etc.

In operation 606, positioning engine 403 of robot controller 102 instructs robot 104 to position robotic arm 201 to grip the target object based on the determined relative positive of the target object with respect to robotic arm 201. For example, such instructions may be issued to locomotion system 305 either directly or indirectly via base controller 303 for making robotic arm 201 move. For example, in one embodiment, positioning engine 403 moves robotic arm 201 by sending commands to the motors through locomotion system 305 either directly or indirectly, such as via base controller 303. In one embodiment, such motors move independently of one another at various speeds to drive robotic arm 201 in whichever direction positioning engine 403 requests.

As discussed above, in one embodiment, positioning engine 403 builds and trains a model to correctly position robotic arm 201 to grip a target object based on the determined relative position of the target object (target object previously identified with the determined attributes) with respect to robotic arm 201.

In one embodiment, the model is trained to predict such positioning based on a sample data set that includes the correct instructions to be issued to robot 104, such as locomotion system 305, to correctly position robotic arm 201 to grip a target object based on various relative positions of various target objects with various attributes with respect to robotic arm 201. Such a sample data set may be stored in a data structure (e.g., table) residing within the storage device (e.g., storage device 511, 515) of robot controller 102. In one embodiment, such a data structure is populated by an expert.

Furthermore, in one embodiment, the sample data set discussed above is referred to herein as the "training data," which is used by a machine learning algorithm to make predictions or decisions as to the correct instructions to be issued to robot 104, such as locomotion system 305, to correctly position robotic arm 201 to grip a target object based on the relative position of the target object with respect to robotic arm 201. The algorithm iteratively makes predictions on the training data as to the correct instructions to be issued to robot 104, such as locomotion system 305, to correctly position robotic arm 201 to grip a target object until the predictions achieve the desired accuracy as determined by an expert. Examples of such learning algorithms include nearest neighbor, Naïve Bayes, decision trees, linear regression, support vector machines, and neural networks.

After such a model is trained, it may be utilized by positioning engine 403 to correctly instruct robot 104, such as locomotion system 305, to correctly position robotic arm 201 to grip the identified target object with the determined attributes based on the determined relative position of the target object with respect to robotic arm 201.

In operation 607, activation engine 404 of robot controller 102 activates the selected pore(s) 202 of robotic arm 201 to secrete adhesive 203 according to the determined adhesion level to grip the target object upon positioning robotic arm 201 to grip the target object.

While the following discusses gripping a single target object, it is noted that the principles of the present disclosure may be utilized to grip multiple target objects concurrently. A person of ordinary skill in the art would be capable of applying the principles of the present disclosure to such implementations. Furthermore, embodiments applying the principles of the present disclosure to such implementations would fall within the scope of the present disclosure.

As discussed above, in one embodiment, pores 202 of robotic arm 201 have programmatic controlled valves so that pores 202 can be opened programmatically, such as by activation engine 404. In one embodiment, such valves correspond to flow control valves (e.g., ASCO™ series 226 and the like) or pneumatic valves (e.g., robot-arm-mounted electrically operated air on/off valves by McMaster-Carr® and the like). In one embodiment, these valves are controlled by activation engine 404, which decides when to open or close the valves. The programmatic control of the valves allows robotic arm 201 to apply adhesive 203 in a precise and controlled manner. By opening and closing the valves at the right times, robotic arm 201 will be able to apply adhesive 203 via pores 202 exactly where needed, with the right amount of pressure and for the right length of time to ensure that adhesive 203 is applied consistently and efficiently.

In one embodiment, the valve(s) for the selected pore(s) 202 of robotic arm 201 are activated by activation engine 404 by applying power to the respective valve(s) and deactivated (closed) when activation engine 404 does not apply power (e.g., spring closes the valve when power is not applied). In one embodiment, the valve(s) for the selected pore(s) 202 of robotic arm 201 are activated by activation engine 404 by driving such a valve(s) using a DC or AC voltage source.

In operation 608, upon gripping the target object by activating pore(s) 202 of robotic arm 201 to secrete adhesive 203 according to the determined adhesion level, positioning engine 403 of robot controller 102 instructs robot 104 to lift the target object and move the target object to a desired location, such as to a location where the gripped target object is to be used in combination with another target object (e.g., part) to enable the assembling of a final product or a component of the final product.

As stated above, in one embodiment, the desired location is pre-determined, such as by an expert. In one embodiment, the exact location of such a desired location is determined based on floor plan 307. For example, such a desired location may correspond to a job location, such as a location to assemble a final product.

In one embodiment, positioning engine 403 instructs base controller 303 to generate a command signal that causes onboard navigation system 304 to start driving robot 104 to the specified destination. In one embodiment, onboard navigation system 304 operates in combination with locomotion system 305 to drive robot 104 from its current location to the desired location along the established movement path as determined by floor plan 307.

In one embodiment, locomotion system 305 includes the hardware and electronics necessary for making robot 104 move including, for example, motors, wheels, feedback mechanisms for the motors and wheels, and encoders. In one embodiment, onboard navigation system 304 "drives" robot 104 by sending commands down to the wheels and motors through locomotion system 305.

In operation 609, detachment mechanism 405 of robot controller 102 instructs robot 104 to generate vibrations to detach the target object from robotic arm 201 upon moving the target object to the desired location.

As discussed above, in one embodiment, the location of the target object is determined to have reached the desired location based on the location of the target object, which is known via the RFID tag attached to the object, matching the desired location.

In one embodiment, the current location of robot 104 in industrial facility 101 is determined based on location information (e.g., GPS (Global Positioning System) data) being provided to robot controller 102 via the attached IoT sensor 105. As a result, the location of the target object is determined to have reached the desired location based on the location of robot 104 matching the desired location.

In one embodiment, detachment mechanism 405 instructs robot 104 to detach the target object from robotic arm 201 upon moving the target object to the desired location by activating vibrating mechanism 315, such as a spindle, to generate vibrations to detach the target object from robotic arm 201 upon robot 104 moving the target object to the desired location. In one embodiment, such vibrations are controlled programmatically, such as by detachment mechanism 405 via base controller 303. In one embodiment, such vibrations are used to detach the target object from the sticky adhesive 203. In one embodiment, the intensity and frequency of the vibrations are adjusted based on the attributes (e.g., shape, dimensions, texture, weight, chemical properties, etc.) of the target object and the strength or adhesion level of adhesive 203. In one embodiment, such vibrations are gentle enough so as to not cause damage to the target object or the surrounding environment yet strong enough to cause the release of the target object from robotic arm 201. In one embodiment, the vibrations are controlled programmatically based on the attributes (e.g., shape, dimensions, texture, weight, chemical properties, etc.) of the target object and the strength or adhesion level of adhesive 203 using a data structure (e.g., table) that includes the level of vibrations proportional to the attributes of the objects as well as the strength or adhesion level of adhesive 203. In one embodiment, such a data structure resides within the storage device (e.g., storage device 511, 515) of robot controller 102. In one embodiment, such a data structure is populated by an expert.

In one embodiment, detachment mechanism 405 programmatically controls the vibrations to be generated by vibrating mechanism 315 by applying or not applying power to vibrating mechanism 315. In one embodiment, detachment mechanism 405 programmatically controls the vibrations to be generated by vibrating mechanism 315 using a DC or AC voltage source. In one embodiment, detachment mechanism 405 controls the intensity and frequency of the vibrations based on the voltage level of the DC or AC voltage source. For example, the higher the DC or AC voltage source, the greater the intensity and frequency of the vibrations and vice-versa.

Examples of vibrating mechanism 315 can include, but are not limited to, Zimmer® HFL04-103-01-A-00 machine spindle and the like.

In one embodiment, upon detaching the target object from robotic arm 201, any adhesive residue remaining on robotic arm 201 may be cleaned. In one embodiment, the cleaning method is selected based on the type of adhesive 203 used and the material of robotic arm 201. For example, if adhesive 203 is water-soluble, then robotic arm 201 may be cleaned with water or a water-based solution. Alternatively, if adhesive 203 is not water-soluble, then a solvent-based solution may be used for cleaning robotic arm 201.

In one embodiment, a cleaning mechanism may be integrated with the components of robot 104 as shown in FIG. 3 and can be programmed to clean robotic arm 201 after each use or at regular intervals. In one embodiment, the cleaning process is automated, and the cleaning solution is dispensed through the opening pores 202 of robotic arm 201. Once the cleaning process is complete, robotic arm 201 is ready for its next use.

In this manner, objects (e.g., parts used in the assembly process), such as objects in an assembly plant, are appropriately gripped by robots using a robotic arm that intelligently secretes an adhesive in selected pores of the robotic arm thereby resulting in fewer objects (e.g., parts used in the assembly process) being broken and positioning objects (e.g., parts used in the assembly process) in the correct position for assembling.

Furthermore, the principles of the present disclosure improve the technology or technical field involving a manufacturing process.

As discussed above, in manufacturing processes, robotic systems (robots) are often used to automate repetitive, menial tasks, such as material handling and assembly. Robots provide numerous benefits in metal and plastic manufacturing, including improved efficiency, precision, and quality. They can perform tasks such as welding, cutting, assembly, shipping, handling raw materials, product packing, machining, and molding with a high degree of accuracy and repeatability, ensuring consistent production of high-quality parts. For this reason, multiple manufacturers are leveraging robotic automation for an increased number of tasks. In the manufacturing process, different types of metallic and non-metallic parts may be assembled using robots. Such parts may need to be gripped by the robots, such as on an assembly line. Some of these parts are delicate and need to be handled carefully. Furthermore, some of these parts may need to be extracted from a narrow passage. Hence, such parts may be difficult to be gripped by the robots, such as via grippers, robotic jaws, etc. By not being able to appropriately grip parts, such parts may end up being broken or not being placed in the appropriate position to be properly assembled with other parts.

Embodiments of the present disclosure improve such technology by identifying a target object (e.g., circuit board, brake pads, brake rotors, brake shoes, wheel cylinders, wheel bearings, wheel studs, etc.) to be gripped by a robotic arm of the robot, such as a robot in an industrial facility (e.g., assembly plant). In one embodiment, the target object is identified by analyzing captured images of the target object using image processing techniques. Upon identifying the target object (e.g., circuit board of type A) to be gripped by the robotic arm of the robot, the attributes of the target object are determined. Attributes, as used herein, refer to the quality or feature regarded as a characteristic or inherent part of the target object. Examples of attributes can include, but are not limited to, shape, dimensions, texture, weight, chemical properties, etc. In one embodiment, such attributes are determined by accessing a data structure (e.g., table) storing attributes for the various objects that may be gripped by the robots in the industrial facility. One or more pores of the robotic arm may then be selected to be enabled to secrete an adhesive based on the attributes of the target object. Such pores are openings located on the surface of the robotic arm. The use of pores allow for precise and controlled application of the adhesive (e.g., rubber-based adhesives, acrylic-based adhesives, silicone-based adhesives, etc.). The adhesion level corresponding to the amount of the adhesive to be secreted by the selected pores of the robotic arm is determined based on the attributes of the target object. For example, a target object with a greater dimension, shape and/or weight may require a greater amount of the adhesive to be secreted by the selected pores in order for the robotic arm to securely grip the target object. The selected one or more pores of the robotic arm are then activated to secrete the adhesive according to the adhesion level in order to appropriately grip the target object by the robotic arm. In this manner, robots are enabled to appropriately grip objects using a robotic arm, such as in an assembly plant, which results in fewer parts being broken and positioning parts in the correct position for assembling. Furthermore, in this manner, there is an improvement in the technical field involving a manufacturing process.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for appropriately gripping objects by robots, the method comprising:
    identifying a target object to be gripped by a robotic arm of a robot, wherein the robotic arm contains a plurality of pores configured to secrete an adhesive for gripping objects;
    determining attributes of the target object;
    selecting one or more pores of the plurality of pores of the robotic arm to be enabled to secrete the adhesive based on the attributes of the target object;
    determining an adhesion level corresponding to an amount of the adhesive to be secreted by the selected one or more pores of the plurality of pores of the robotic arm based on the attributes of the target object; and
    activating the selected one or more pores of the plurality of pores of the robotic arm to secrete the adhesive according to the adhesion level to grip the target object by the robotic arm.

2. The method as recited in claim 1 further comprising:
    determining a relative position of the target object with respect to the robotic arm; and
    instructing the robot to position the robotic arm to grip the target object based on the determined relative position of the target object with respect to the robotic arm.

3. The method as recited in claim 2 further comprising:
    instructing the robot to lift the target object and move the target object to a desired location upon gripping the target object using the activated one or more pores of the plurality of pores of the robotic arm secreting the adhesive according to the adhesion level.

4. The method as recited in claim 3 further comprising:
    instructing the robot to generate vibrations to detach the target object from the robotic arm upon moving the target object to the desired location.

5. The method as recited in claim 1, wherein the attributes comprise a shape, a dimension, a weight, and chemical properties.

6. The method as recited in claim 1, wherein the plurality of pores of the robotic arm are connected via a channel within the robotic arm, wherein the channel within the robotic arm is used to allow a flow of the adhesive to the selected one or more pores of the plurality of pores.

7. The method as recited in claim 1, wherein the selected one or more pores of the plurality of pores of the robotic arm are enabled to secrete the adhesive according to the adhesion level using programmatic controlled valves.

8. A computer program product for appropriately gripping objects by robots, the computer program product comprising one or more computer readable storage mediums having program code embodied therewith, the program code comprising programming instructions for:
    identifying a target object to be gripped by a robotic arm of a robot, wherein the robotic arm contains a plurality of pores configured to secrete an adhesive for gripping objects;
    determining attributes of the target object;
    selecting one or more pores of the plurality of pores of the robotic arm to be enabled to secrete the adhesive based on the attributes of the target object;
    determining an adhesion level corresponding to an amount of the adhesive to be secreted by the selected one or more pores of the plurality of pores of the robotic arm based on the attributes of the target object; and activating the selected one or more pores of the plurality of pores of the robotic arm to secrete the adhesive according to the adhesion level to grip the target object by the robotic arm.

9. The computer program product as recited in claim 8, wherein the program code further comprises the programming instructions for:

determining a relative position of the target object with respect to the robotic arm; and instructing the robot to position the robotic arm to grip the target object based on the determined relative position of the target object with respect to the robotic arm.

10. The computer program product as recited in claim 9, wherein the program code further comprises the programming instructions for:

instructing the robot to lift the target object and move the target object to a desired location upon gripping the target object using the activated one or more pores of the plurality of pores of the robotic arm secreting the adhesive according to the adhesion level.

11. The computer program product as recited in claim 10, wherein the program code further comprises the programming instructions for:

instructing the robot to generate vibrations to detach the target object from the robotic arm upon moving the target object to the desired location.

12. The computer program product as recited in claim 8, wherein the attributes comprise a shape, a dimension, a weight, and chemical properties.

13. The computer program product as recited in claim 8, wherein the plurality of pores of the robotic arm are connected via a channel within the robotic arm, wherein the channel within the robotic arm is used to allow a flow of the adhesive to the selected one or more pores of the plurality of pores.

14. The computer program product as recited in claim 8, wherein the selected one or more pores of the plurality of pores of the robotic arm are enabled to secrete the adhesive according to the adhesion level using programmatic controlled valves.

15. A system, comprising:

a memory for storing a computer program for appropriately gripping objects by robots; and a processor connected to the memory, wherein the processor is configured to execute program instructions of the computer program comprising:

identifying a target object to be gripped by a robotic arm of a robot, wherein the robotic arm contains a plurality of pores configured to secrete an adhesive for gripping objects;

determining attributes of the target object;

selecting one or more pores of the plurality of pores of the robotic arm to be enabled to secrete the adhesive based on the attributes of the target object;

determining an adhesion level corresponding to an amount of the adhesive to be secreted by the selected one or more pores of the plurality of pores of the robotic arm based on the attributes of the target object; and activating the selected one or more pores of the plurality of pores of the robotic arm to secrete the adhesive according to the adhesion level to grip the target object by the robotic arm.

16. The system as recited in claim 15, wherein the program instructions of the computer program further comprise:

determining a relative position of the target object with respect to the robotic arm; and instructing the robot to position the robotic arm to grip the target object based on the determined relative position of the target object with respect to the robotic arm.

17. The system as recited in claim 16, wherein the program instructions of the computer program further comprise:

instructing the robot to lift the target object and move the target object to a desired location upon gripping the target object using the activated one or more pores of the plurality of pores of the robotic arm secreting the adhesive according to the adhesion level.

18. The system as recited in claim 17, wherein the program instructions of the computer program further comprise:

instructing the robot to generate vibrations to detach the target object from the robotic arm upon moving the target object to the desired location.

19. The system as recited in claim 15, wherein the attributes comprise a shape, a dimension, a weight, and chemical properties.

20. The system as recited in claim 15, wherein the plurality of pores of the robotic arm are connected via a channel within the robotic arm, wherein the channel within the robotic arm is used to allow a flow of the adhesive to the selected one or more pores of the plurality of pores.

* * * * *